(12) United States Patent
Lai et al.

(10) Patent No.: US 10,926,742 B2
(45) Date of Patent: Feb. 23, 2021

(54) SYSTEMS AND METHODS FOR DYNAMICALLY ALLOCATING ENERGY AMONG EXCHANGEABLE ENERGY STORAGE DEVICE STATIONS

(71) Applicant: Gogoro Inc., Hong Kong (CN)

(72) Inventors: Yun-Chun Lai, Hsinchu (TW); Sheng-Chin Chuang, New Taipei (TW); Chien-Chung Chen, Taoyuan (TW); I-Fen Shih, New Taipei (TW); Hok-Sum Horace Luke, Mercer Island, WA (US); Bo-Yu Chu, Taipei (TW)

(73) Assignee: Gogoro Inc., Hong Kong (CN)

( * ) Notice: Subject to any disclaimer, the term of this patent is extended or adjusted under 35 U.S.C. 154(b) by 111 days.

(21) Appl. No.: 16/236,189

(22) Filed: Dec. 28, 2018

(65) Prior Publication Data

US 2019/0202415 A1   Jul. 4, 2019

Related U.S. Application Data

(60) Provisional application No. 62/612,245, filed on Dec. 29, 2017.

(51) Int. Cl.
*B60S 5/06* (2019.01)
*G06Q 10/02* (2012.01)
(Continued)

(52) U.S. Cl.
CPC .............. *B60S 5/06* (2013.01); *B60L 53/305* (2019.02); *B60L 53/64* (2019.02); *B60L 53/80* (2019.02);
(Continued)

(58) Field of Classification Search
CPC .... B60S 5/06; G06Q 10/025; G06Q 30/0206; G06Q 50/30; G06Q 10/06315; B60L 53/64; B60L 53/305; B60L 53/80; B60L 53/68
(Continued)

(56) References Cited

U.S. PATENT DOCUMENTS 8,798,852 B1    8/2014  Chen et al.
9,527,394 B1 *  12/2016 Tang ................... B60W 10/26
(Continued)

FOREIGN PATENT DOCUMENTS

EP    0986034 A2    3/2000
JP    2011197932 A  6/2011
(Continued)

OTHER PUBLICATIONS

Notice of Publication received for co-pending Philippines Patent Application No. PH1-2019-000005, Applicant: Gogoro Inc., Date of Mailing: Aug. 22, 2019, 2 pages.
(Continued)

*Primary Examiner* — M Baye Diao
(74) *Attorney, Agent, or Firm* — Perkins Coie LLP

(57) ABSTRACT

The present disclosure relates to methods and associated systems for managing a plurality of device-exchange stations. The method includes, for example, (1) determining a score for each of the plurality of device-exchange stations based on an availability of energy storage devices positioned in each of the device-exchange stations; (2) determining a sequence of the plurality of device-exchange stations based on the score of each of the device-exchange stations; and (3) determining a price rate for each of the device-exchange stations by mapping the sequence of the device-exchange stations to a characteristic curve corresponding to a distribution of the price rate.

20 Claims, 19 Drawing Sheets

(51) Int. Cl.
  *G06Q 30/02* (2012.01)
  *B60L 53/64* (2019.01)
  *B60L 53/30* (2019.01)
  *B60L 53/80* (2019.01)
  *G06Q 50/30* (2012.01)
  *B60L 53/68* (2019.01)
(52) U.S. Cl.
  CPC ....... *G06Q 10/025* (2013.01); *G06Q 30/0206* (2013.01); *B60L 53/68* (2019.02); *G06Q 50/30* (2013.01)
(58) Field of Classification Search
  USPC .......................................................... 320/104
  See application file for complete search history.

(56) References Cited

U.S. PATENT DOCUMENTS

| | | | | |
|---|---|---|---|---|
| 9,940,840 | B1* | 4/2018 | Schubert | .................... B61B 3/00 |
| 10,406,931 | B2* | 9/2019 | Nakano | .................... B60L 58/12 |
| 10,685,364 | B2* | 6/2020 | Perelmutov | ........ G06Q 30/0205 |
| 2003/0209375 | A1* | 11/2003 | Suzuki | ...................... H02J 7/00 |
| | | | | 180/65.22 |
| 2007/0184339 | A1* | 8/2007 | Scheucher | .............. B60L 50/66 |
| | | | | 429/99 |
| 2011/0156662 | A1 | 6/2011 | Nakamura et al. | |
| 2013/0030630 | A1 | 1/2013 | Luke et al. | |
| 2014/0266006 | A1 | 9/2014 | Luke et al. | |
| 2015/0185040 | A1 | 7/2015 | Wu et al. | |
| 2015/0242868 | A1* | 8/2015 | Perelmutov | ........ G01C 21/3679 |
| | | | | 705/7.34 |
| 2016/0254671 | A1* | 9/2016 | Outright | ............... H02J 7/0068 |
| | | | | 700/295 |
| 2016/0292937 | A1 | 10/2016 | Taylor et al. | |
| 2017/0039668 | A1 | 2/2017 | Luke et al. | |
| 2017/0053459 | A9 | 2/2017 | Luke | |
| 2017/0158070 | A1 | 6/2017 | Salasoo | |
| 2017/0253138 | A1 | 9/2017 | Ger | |

FOREIGN PATENT DOCUMENTS

| | | | |
|---|---|---|---|
| JP | 2015015827 | A | 1/2015 |
| JP | 2016116403 | A | 6/2016 |
| JP | 2017093258 | A | 5/2017 |
| KR | 10-2012-0070651 | A | 7/2012 |
| KR | 1020160092733 | A | 8/2016 |
| KR | 1020160139996 | A | 12/2016 |
| WO | 2017210170 | A1 | 12/2017 |

OTHER PUBLICATIONS

European Search Report received for co-pending European Patent Application No. EP 18248292.7, Applicant: Gogoro Inc., dated Feb. 20, 2019, 6 pages.

Wikipedia, "Gogoro," Internet Article retrieved on Dec. 15, 2017, URL:https://en.wikipedia.org/w/index.php?title=Gogoro&oldid=815535454, 4 pages.

Vincent Nguyen, "Gogoro Smartscooter is Tesla for the everyman," Internet Article, Jan. 5, 2015, URL:https://www.slashgear.com/gogoro-smartscooter-is-tesla-for-the-everyman-05362021, 22 pages.

Jeffrey Wu, "10 Advantages of Gogoro Smartscooter," Internet Article, Jun. 16, 2015, URL:http://focustaiwan.tw/news/ast/201506160026.aspx, 4 pages.

Gogoro, "Fact Sheet Gogoro Corporate Overview," Internet Article, Jan. 5, 2015, URL:https://images.gogoroapp.com/download/PDF/gogoro-fact-sheet-2015-01-05.pdf, 2 pages.

Office Action Received for co-pending European Application No. EP18248292.7; Applicant Gogoro Inc., dated Jul. 9, 2020, 8 pages.

Patrick T. Moseley et al., "Electrochemical Energy Storage for Renewable Sources and Grid Balancing," Elsevier, Nov. 7, 2014, Chapter 13, 136 pages.

Office Action Received for Korean Application No. KR10-2018-0172893; Applicant: Gogoro Inc., dated May 22, 2020, 5 pages.

* cited by examiner

SYSTEMS AND METHODS FOR DYNAMICALLY ALLOCATING ENERGY AMONG EXCHANGEABLE ENERGY STORAGE DEVICE STATIONS

CROSS-REFERENCE TO RELATED APPLICATION

The present application claims the benefit of and priority to U.S. Provisional Application No. 62/612,245, filed Dec. 29, 2017, which is incorporated herein by reference in its entirety.

BACKGROUND

Some electric vehicles are powered by exchangeable batteries. For such electric vehicles, having sufficiently-charged batteries available to users when they want to make a battery exchange is an important factor in providing a satisfying user experience. However, it is very difficult to predict when and where a user may want to exchange a battery. For a battery exchange system that handles a large number of batteries, it is even more difficult for the system to predict the battery demands and respond accordingly. In addition, charging batteries and maintaining the state of charge of these batteries require a significant amount of energy. Unnecessary charging or maintaining can negatively affect a system's cost-efficiency and energy-efficiency. Therefore, it is advantageous to have an improved system and method to address the foregoing issues.

BRIEF DESCRIPTION OF THE DRAWINGS

Embodiments of the disclosed technology will be described and explained through the use of the accompanying drawings.

Figure 1A:
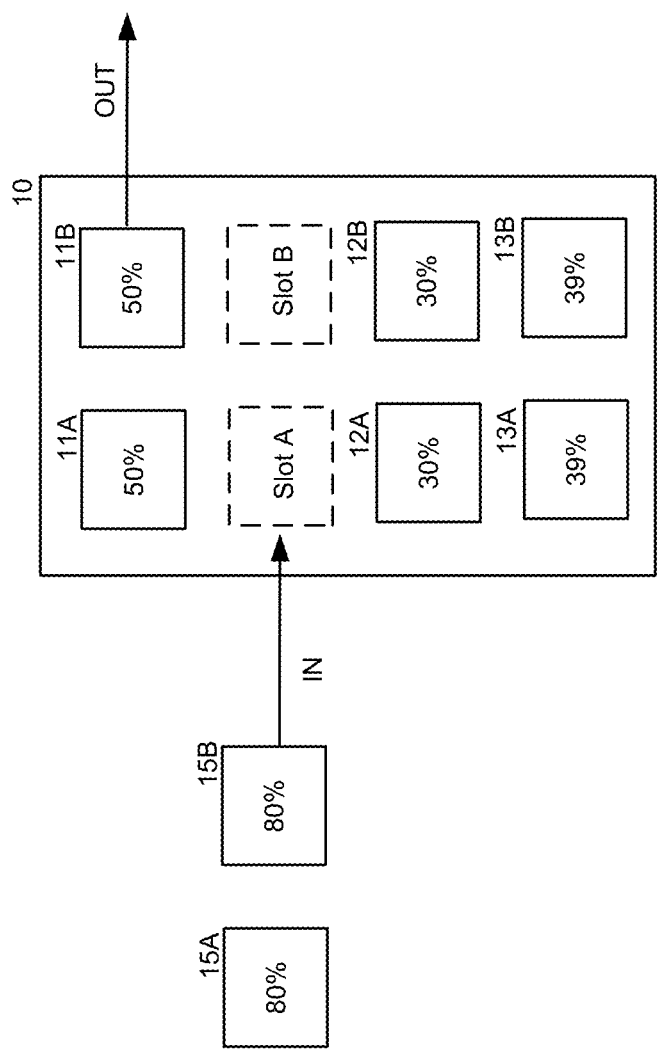
FIG. 1A is a schematic diagram illustrating an incentivized battery exchange system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present technology is directed to systems and methods for dynamically allocating energy (e.g., stored in a battery) among multiple exchangeable energy storage devices (e.g., exchangeable, rechargeable battery) stations by dynamically setting battery exchange prices in various battery exchange stations. More particularly, the present technology is directed to systems and methods for predicting/analyzing battery demands and then fulfilling the predicted demands. When a battery demand is predicted, there will be several ways to fulfill the predicted battery demand. First, a system can provide a sufficient number of (fully-charged) batteries to meet the predicted battery demand. Second, a system can adopt a "user-influencing" approach so as to increase a battery supply (e.g., ask a user to return a properly-charged battery back to the system) or to decrease a battery demand (e.g., request a user to delay a battery exchange) by changing or influencing user behavior (e.g., by providing motivation or incentives for users to do so). In some embodiments, battery users can be motivated to change their behavior by advertisement, notification, games, encouragements, etc. In some embodiments, battery users can be incentivized by a lower battery exchange price or other suitable incentives (e.g., credits, reward points, etc.) One way to incentivize battery users is to dynamically adjust battery exchange prices at various battery exchange stations, such that the users can be incentivized to exchange batteries at a low-demand station (e.g., to decrease the battery demand at a high-demand station) or to return properly charged batteries (e.g., 80-90% charged) to a high-demand station (e.g., to increase the battery supply).

The present disclosure also relates to a method and system for dynamically allocating energy (e.g., stored in a battery) among multiple exchangeable energy storage device (e.g., exchangeable, rechargeable battery) stations based on a pricing strategy. More particularly, the present technology is directed to systems and methods for predicting and analyzing a battery demands and accordingly managing batteries positioned in multiple stations. The present system collects battery demand information (e.g., from various sources such as a battery memory attached to a battery, battery exchange stations, vehicles, user mobile devices, etc.). For example, the battery demand information can include "the number of exchanged batteries at a particular station during a certain period of time," "the number of batteries exchanged by a user during a certain period of time," or other suitable information (e.g., the characteristics of the exchanged batteries such as their manufacturers, state of charge (SoC), etc.).

Figure 1B:
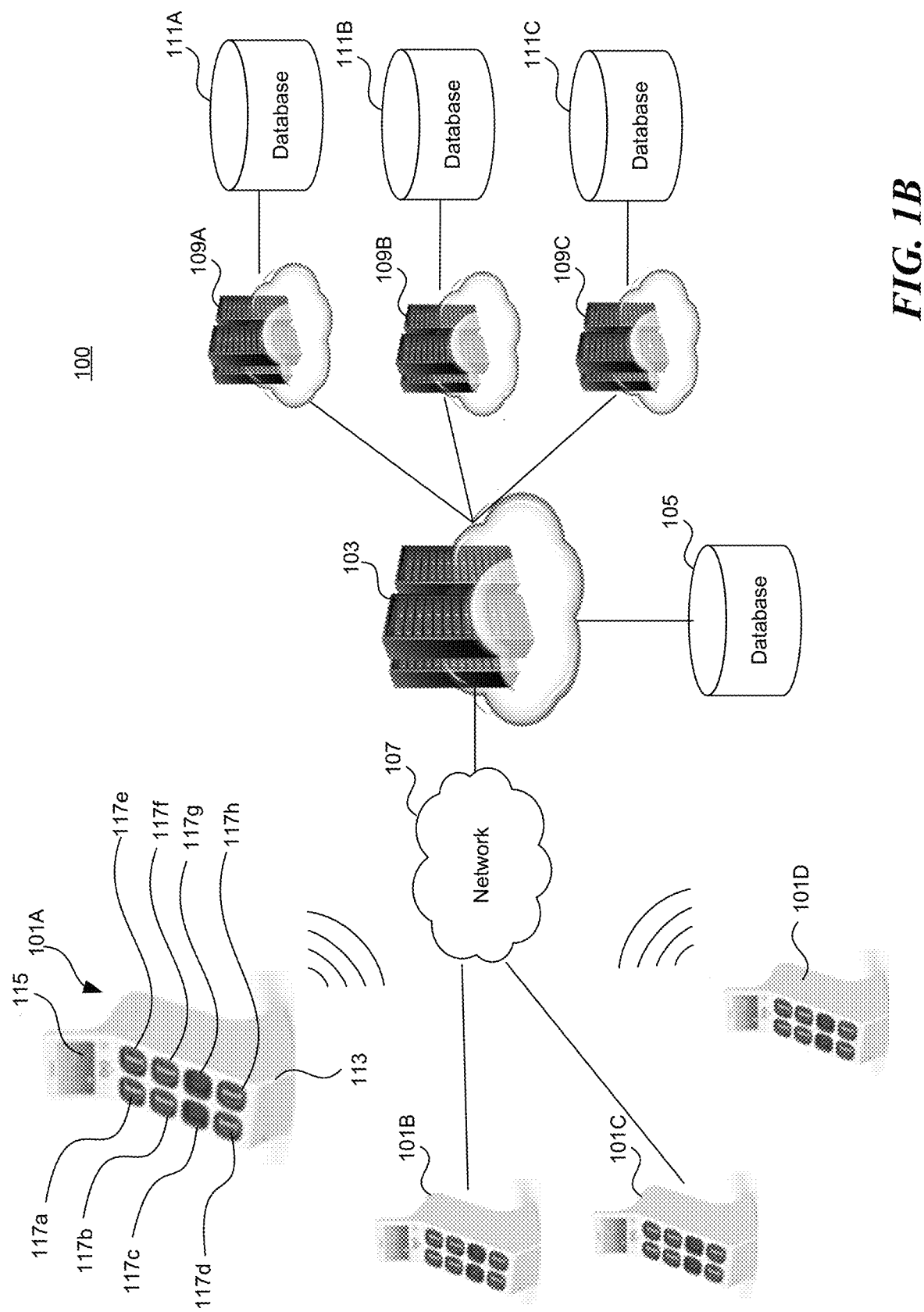
FIG. 1B is a schematic diagram illustrating a system in accordance with embodiments of the disclosed technology. The system is configured to collect battery demand information from multiple battery exchange stations.
Figure 1C:
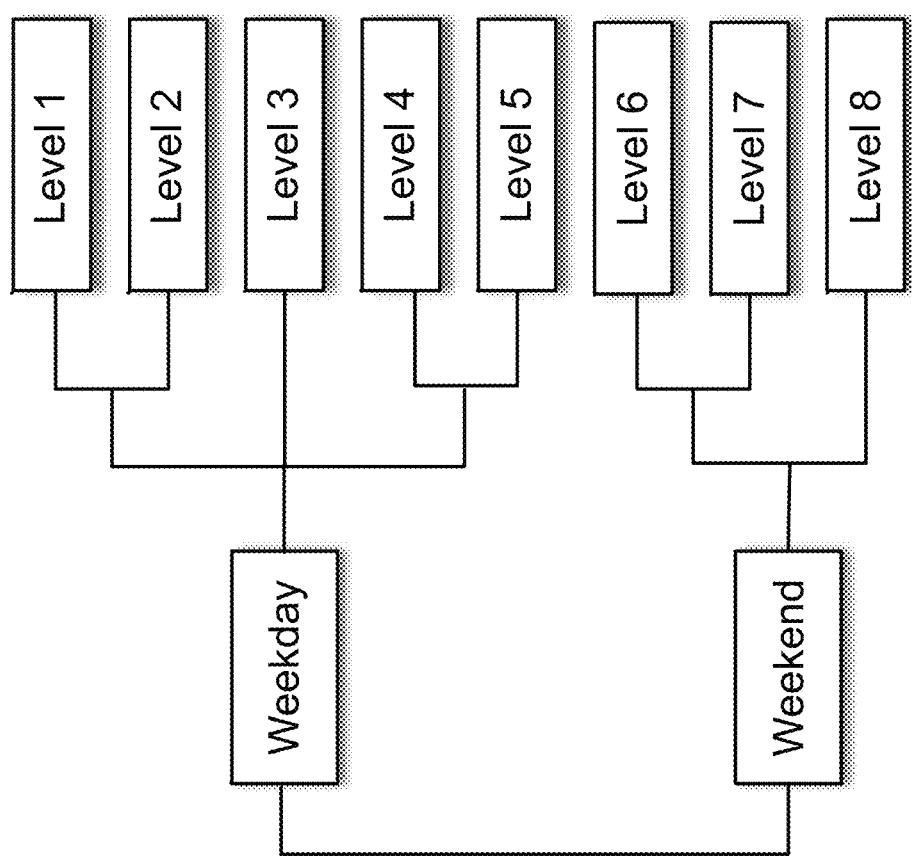
FIG. 1C is a schematic diagram illustrating a clustering process for dividing battery demand information into multiple clusters in accordance with embodiments of the disclosed technology.
Figure 1D:
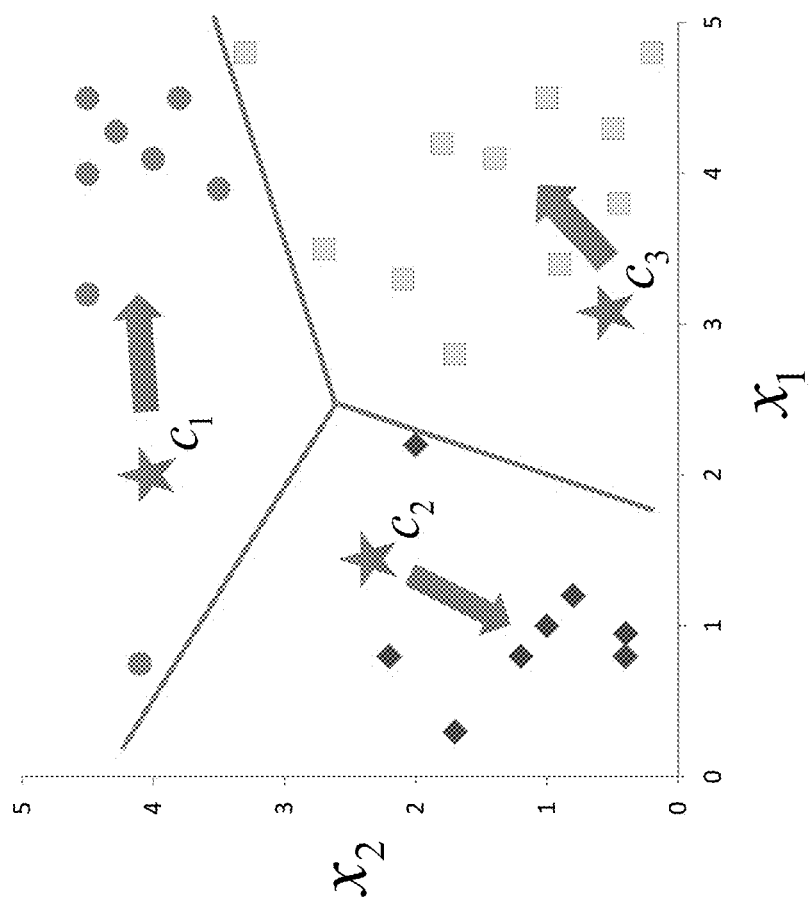
FIG. 1D is a schematic diagram illustrating clustering performed in accordance with embodiments of the disclosed technology.
Figure 1E:
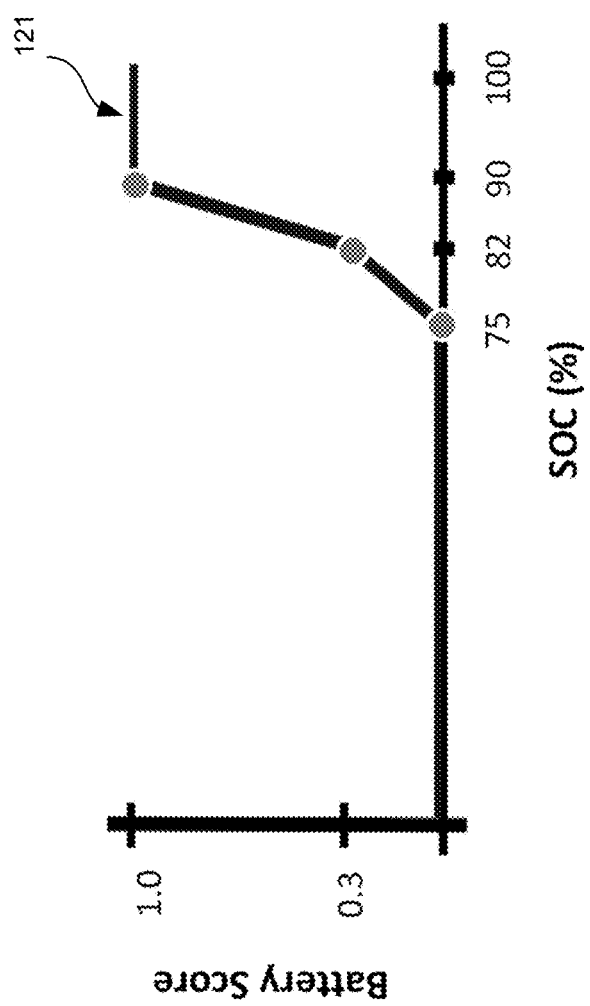
FIG. 1E is a schematic diagram illustrating a battery score described in embodiments of the disclosed technology.
Figure 1F:
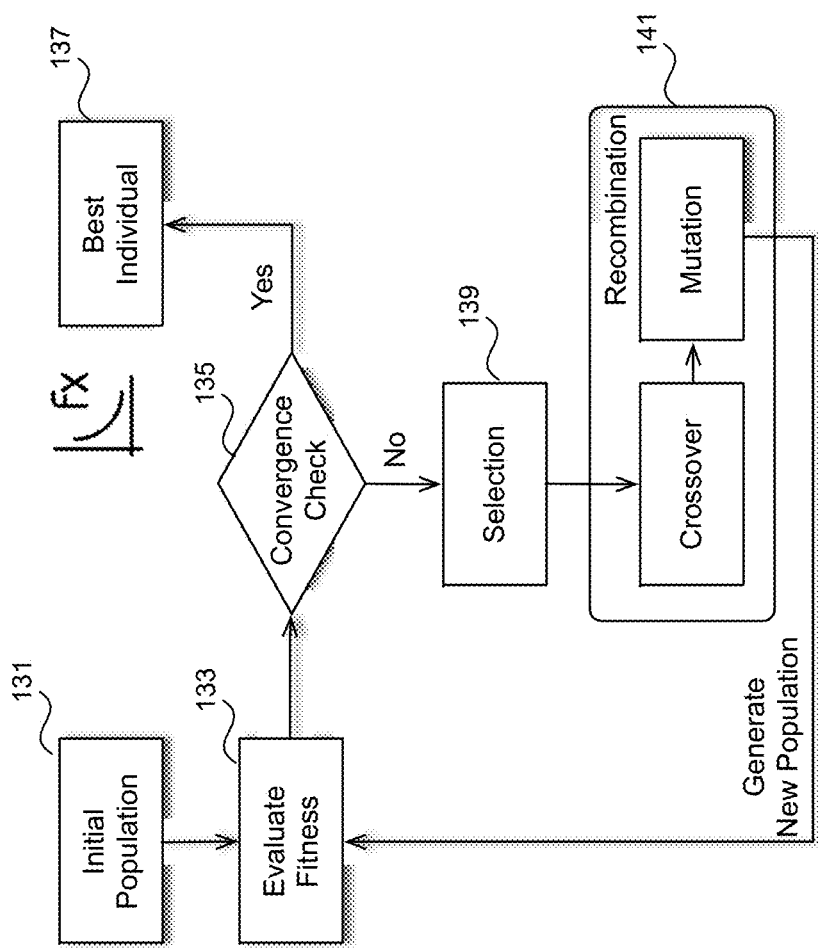
FIG. 1F is a schematic diagram illustrating a use of a genetic algorithm to determine battery demand characteristic functions ($f_c$) in accordance with embodiments of the disclosed technology.
Figure 1G:
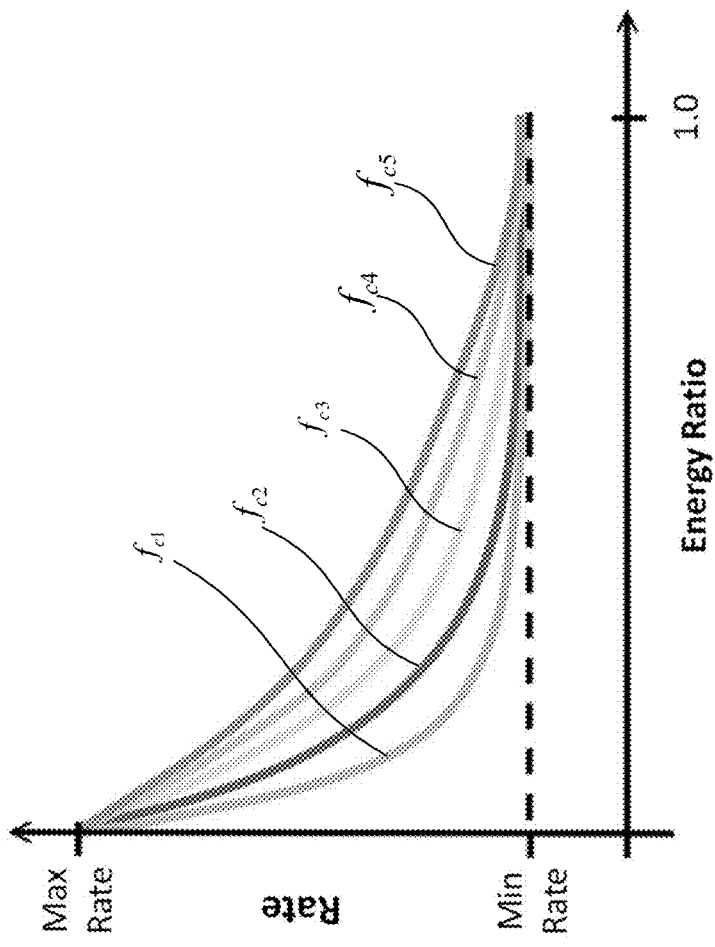
FIG. 1G is a schematic diagram illustrating multiple battery demand characteristic functions ($f_c$) in accordance with embodiments of the disclosed technology.
Figure 1H:
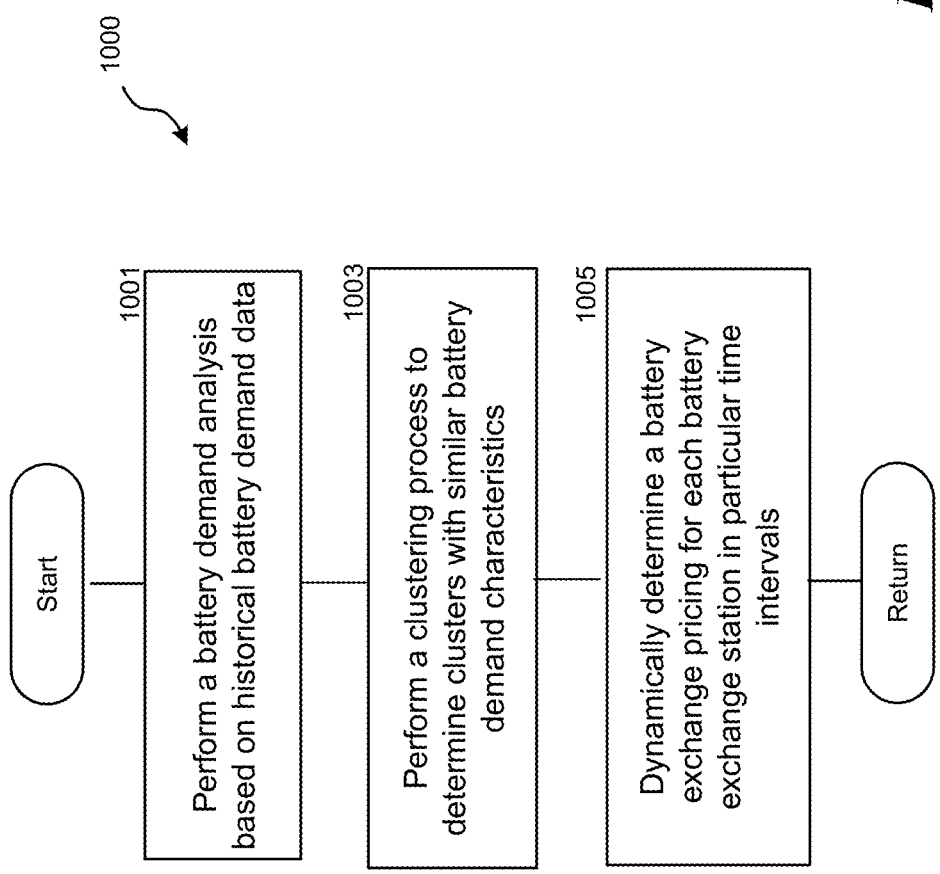
FIG. 1H is a flowchart illustrating a process for setting a battery exchange price based on battery demand information in accordance with embodiments of the disclosed technology.

FIG. 1H provide a process 1000 regarding how a battery exchange price is set based on battery demand information. In short, the disclosed system can first collect historical battery demand information (block 1001) and then analyze the collected information based on a clustering process (e.g., block 1003). As discussed below, the clustering process can divide collected battery demand information into various clusters. Each cluster represents a battery demand type. Based on the clustering result, the disclosed system can further determine a dynamic battery pricing strategy (block 1005), which can be used to motivate battery users to fulfill a predicted battery demand. Embodiments are discussed in detail below.

In the clustering process, the system can divide the collected battery demand information into multiple clusters based on one or more factors. In some embodiments, the clusters can be determined based on time periods (e.g., a cluster represents 9 a.m. to 10 a.m., whereas another cluster represents 3 p.m. to 5 p.m.). Embodiments regarding determining the clusters based on time periods are discussed in detail with reference to FIG. 1C. In some embodiments, the clusters can be determined based on types of battery stations (e.g., a "high-demand-all-time" type, a "high-demand-peak-hours" type, a "high-demand-holidays" type, a "high-demand-weekends" type, a "high-demand-events" type, a "low-demand-all-time" type, etc.; related details are discussed in detail below). In some embodiments, the clusters can be determined based on locations (e.g., a location of a battery exchange, or the location of a vehicle for a vehicle-to-vehicle battery exchange). In some embodiments, the clusters can be determined based on other suitable factors. In one or more of the embodiments discussed below, the clusters are determined based on both "when a battery exchange happens" and "the type of the battery stations." In some embodiments, the clusters can be determined or characterized by various other factors and therefore cannot be readily identified as being closely related to a single factor or two factors. In some embodiments, the clusters can be determined based on a result of a machine learning process.

In some embodiments (e.g., embodiments discussed below with reference to FIGS. 1I and 1J), the clustering process can be skipped.

In some embodiments, clusters with a rate (e.g., the "battery price rate" discussed below) greater than "1" may represent high demand (or a predicted upcoming high demand) where a user is charged a higher rate for a charged battery or conversely is paid a higher rate to sell back a charged battery (e.g., a "sell-back rate"). The sell-back rate for the user can be determined at least partially based on the price rate, the score and the size of the device-exchange stations. For example, a small but busy station may not have the ability to prepare enough batteries to meet a demand in time, so the sell-back rate for this station can be set higher so that the user can help the station to meet the demand. In some embodiments, clusters with a rate (e.g., the "battery price rate" discussed below) lower than "1" represent lessor demand where a user is charged a lower rate for a charged battery or is paid a lower rate to sell back a charged battery.

In some embodiment, a central server of the disclosed system receives all these use statistics, weather reports, special event data etc. and tries to develop a supply-demand function for each charging station or cluster. By dynamically developing a supply/demand curve for each station/cluster, the energy use of the entire system can be better balanced.

Based on the two factors (e.g., time and the station type), the present system then divides the collected battery demand information into multiple clusters $C_1$-$C_n$ (Examples of the clusters can be found in FIG. 1C, which includes 8 clusters Levels 1-8). The multiple clusters $C_1$-$C_n$ can be ranked based on the number of battery exchanges "per station" and per "time interval" (e.g., one hour or two hours). For example, $C_1$ can represent the smallest number of battery exchanges per station and per time interval, and $C_n$ can represent the largest number of battery exchanges per station and per time interval. For example, $C_1$ can represent 0-10 battery exchanges per hour at one station, $C_2$ can represent 1-25 battery exchanges, $C_3$ can represent 26-50 battery exchanges, $C_4$ can represent 51-100 battery exchanges, $C_n$ can represent 10,000 and above battery exchanges, and so on.

In the illustrated embodiments, elements in Cluster $C_1$ can include "time period 1 a.m. to 3 a.m. at Station A" (which is characterized as a low-demand-all-time type of station), "time period 2 a.m. to 6 a.m. at Station B" (which is characterized as a high-demand-events type), and other time-type combinations that fall within the battery exchange numbers represented by cluster $C_1$. As another example, Cluster $C_n$ can include "time period 9 a.m. to 9:45 a.m. at Station C" (which is characterized as a high-demand-peak-hours type), "time period 10 a.m. to 5 p.m. on Saturdays at Station D" (which is characterized as a high-demand-weekends type), and other time-type combinations that fall within the battery exchange number represented by cluster $C_n$.

In some embodiments, the multiple clusters can be determined based on the collected battery demand information. For example, the multiple clusters can be determined based on a K-means clustering process, which is discussed in detail below with reference to FIG. 1D.

To be able to motivate battery users to take actions (e.g., to increase a battery supply or to decrease a battery demand during a certain time period), the disclosed system can dynamically adjust the battery exchange price at each battery station. The disclosed system can achieve this goal by generating a dynamic pricing model as described below.

For each cluster, the present system can generate a characteristic function ($f_c$), which reflects the relationship between the availability of batteries and a price rate. In some embodiment, the characteristic function is determined based on an "energy ratio" of the cluster, and a "battery price rate."

The energy ratio is determined based on an available battery energy associated with a battery exchange event. The energy ratio can be defined as a ratio of "battery score" to a "battery count." In short, the battery score can be defined as a battery energy level (e.g., state of charge, SoC) of a battery when the battery is exchanged (e.g., removed by a user from a battery exchange station). For example, the battery score can be "1" when the battery energy level is more than 90% (e.g., being 90% charged) when that battery is exchanged. In some embodiments, the battery score can be "0.3" when the battery energy level is at 82% (e.g., being 82% charged) when that battery is exchanged. In some embodiments, the battery score can be defined as an index indicating whether a battery station has sufficient fully charged batteries. Embodiments regarding the battery score are discussed below with reference to FIG. 1E.

The "battery count" can represent the number of available batteries at the battery exchange station. For example, the battery count can be "3" if a battery exchange station has three fully-charged batteries available for a user to swap. As another example, the battery count can be "6" if a battery exchange station has six 90% charged batteries available for a user to swap.

Based on the "battery score" and the "battery count," the energy ratio can be determined. The energy ratio can be used to generate the characteristic function. Embodiments of the characteristic function are discussed below with reference to FIG. 1G. For example, the horizontal axis of the figure shown in FIG. 1G represents the energy ratio, whereas the vertical axis of the same figure represents the "battery price rate."

As described above, each cluster has a corresponding characteristic function ($f_c$). The corresponding characteristic function can be in form of curves, as shown in FIG. 1G. These curves indicate that, even during the time intervals in the same cluster, users can receive batteries with different battery exchange prices (e.g., the "Rate" shown in FIG. 1G) if the energy ratio of the battery station changes.

The "battery price rate" is a reference pricing number reflecting how much a battery exchange service provider charges a user for a battery exchange. The battery price rate can have a maximum value and a minimum value (i.e., the range of the price rate). The "battery price rate" is a factor determined by a system operator. In some embodiments, a system operator can determine a "base rate" as the price for a battery user to consume one unit of power (e.g., 1 Ahr). The battery exchange price can then be calculated by multiplying the base rate by the amount of power consumed. The present system can predict a possible battery demand (e.g., by determining the characteristic functions for each cluster) based on the collected battery demand information and the determined battery price rate (e.g., higher priced batteries should have less demand). The determined characteristic functions can then be used as guidance to determine a battery exchange price at each corresponding battery exchange station in each time interval. The battery exchange price can be "dynamic" because the characteristic functions can be generated or updated in a real-time (e.g., milliseconds to seconds) or near real-time (e.g., minutes to hours) fashion. In some embodiments, the clustering process can also be "dynamic" in a similar fashion (e.g., the clustering process can be performed in a real-time or near real-time manner).

In some embodiments, the characteristic functions can be determined based on a machine learning process. In some embodiments, the characteristic functions can be determined based on a generic algorithm (GA). Embodiments of the generic algorithm are discussed below with reference to FIG. 1F.

Figure 1I:
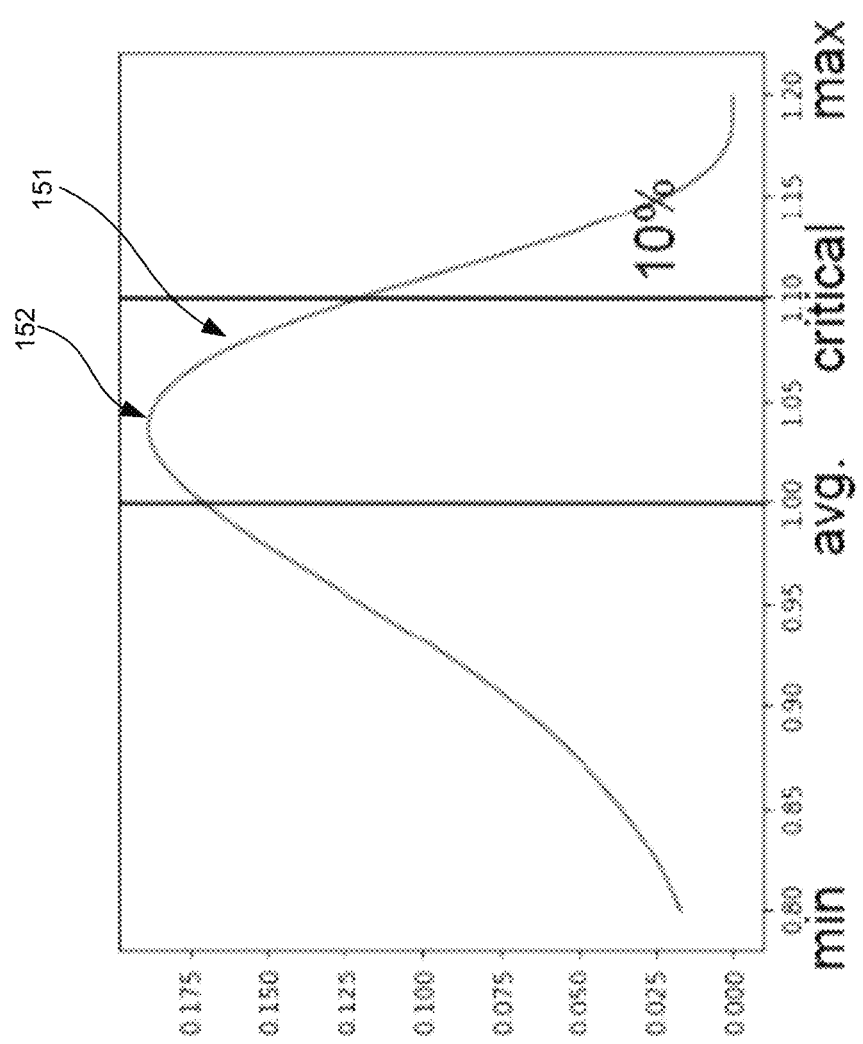
FIG. 1I is a schematic diagram illustrating a characteristic curve in accordance with embodiments of the disclosed technology.

As an alternative technique, in some embodiments, the disclosed system can determine battery exchange prices based on a characteristic curve (e.g., a normal distribution curve or a "bell curve," or a curve adjusted (e.g., skewed) from the normal distribution curve, etc.). For example, FIG. 1I illustrates a characteristic curve 151 in accordance with embodiments of the present technology. The horizontal axis in FIG. 1I represents the battery price rate (as discussed above with reference to FIG. 1G). As shown, the characteristic curve 151 is in a pricing range from 0.8 (minimum) to 1.2 (maximum), which can be set by the system or a system operator. When the battery price rate is "1," the supply and demand of the batteries are assumed to be balanced. When the battery price rate is higher than "1," the battery price is relatively high so that the battery demand can be decreased. When the battery price rate is lower than "1," the battery price is relatively low such that the users can be influenced, and the battery demand may increase. As shown in FIG. 1I, a critical battery price rate is set as "1.1" (e.g., 110% of the average battery price rate "1") to prevent the battery price from going too high to negatively affect users' battery experience (e.g., users can be upset when paying at a higher rate). In some embodiments, when the battery price rate is lower than "1," the battery price may be lower than the system operator's expenses/costs for providing/preparing the battery, therefore the system operator may want to limit such situation to avoid losing profit.

The vertical axis in FIG. 1I represents the probability density, which means, most of the price rates that are to be assigned to the device-exchange station are near the peak of the characteristic curve 151 (e.g., the peak is indicative of an "expectation value" of the characteristic curve 151, to be discussed in detail below). The characteristic curve 151 is a distribution that can be used to dynamically adjust battery price rates for a plurality of batteries (or other suitable energy storage devices) in an administrative area (e.g., a city, a county, a neighborhood, etc.) or a geometric area e.g., a circular area with a diameter of 5-25 kilometers). In some embodiments, the plurality of device-exchange stations can be located within an area where a determined group of users (e.g., employees of a company, faculty of a school, etc.) frequently exchange energy storage devices.

By using the characteristic curve 151, the disclosed system determines the battery price in a particular area and makes sure the distribution of the battery prices in various battery-exchange stations in that area are in accordance with the distribution of the characteristic curve 151 (e.g., only a limited amount of batteries are "expensive" or "cheap," while the most of the batteries are set at a normal price (e.g., the average price rate "1" or slightly lower/above "1"). By this arrangement, the system can provide a dynamic and balanced battery pricing structure in selected areas, so as to enhance user experiences and balance energy (e.g., stored in batteries) among battery-exchange stations. For example, the battery-exchange stations can be ranked or arranged in an order based on their battery scores (e.g., from high to low) so as to form a "sequence" of the stations. Then the price rate for each station can be determined by "mapping" the sequence to the characteristic curve 151. The disclosed embodiments associated with the characteristic curve 151 are discussed below with reference to FIG. 1J.

In some embodiments, the disclosed system can adjust the price rate based on proximity or adjacency of the battery-exchange stations. For example, station A1 and station A2 are in proximity (e.g., within 1 kilometer). The disclosed system can adjust the price rates of stations A1 and A2 to the same price rate (e.g., an average of the price rates originally determined for stations A1 and A2 based on the characteristic curve 151). In some embodiments, one of the price rates of stations A1 and A2 can be set at a lower rate (or a higher rate) so as to let the users be aware of the change of the price rates and keep them interested in exchanging/swapping a cheaper battery.

In some embodiments the disclosed system can further adjust the price rates based on geographic areas or administrative districts. In some embodiments, for example, each administrative district or geographic area can have a sub-characteristic curve (e.g., similar to the characteristic curve 151, such as a normal distribution curve), and the price rates for the stations in each administrative district or geographic area can be further adjusted based on the sub-characteristic curves. In this case, the sub-characteristic curves may be determined based on the price rates of the device-exchange stations within the geographic areas or administrative districts. For example, the average of the price rates of the device-exchange stations within the geographic areas can be set as the expectation value of the sub-characteristic curve (which can be different from the expectation value of the characteristic curve 151). The stations in administrative district AD1 can be ranked based on their battery scores to form a sub-sequence of the stations in AD1. By mapping the sub-sequence of stations in AD1 to the sub-characteristic curve for AD1, the price rates for the stations in AD1 can be further adjusted. The same approach can be used for the stations in administrative districts with a similar size (e.g., administrative district AD2). Accordingly, the present technology can balance the price rate in each administrative district or geographic area.

Adjusting the price rates of the device-exchange stations in a small geographic area can make the users more willing to exchange/swap cheaper batteries (e.g., since there are cheaper batteries in only a few blocks away, it's convenient for the users). Balancing the price rates of the device-exchange stations in different administrative districts (e.g., a larger area) includes setting similar expectation values to the sub-characteristic curves (though a price rate range can still be different). By this configuration, users who live in a dense area (e.g., AD1 is located in a downtown area and the battery demand there is strong) do not feel that they have to get expensive batteries all the time (e.g., more expensive than those in administrative district AD2, which is a rural area). In some embodiments, the system may re-adjust the price rates of the device-exchange stations based on simple rules and instructions, rather than mapping on a curve such as the sub-characteristic curve mentioned above.

Figure 1J:
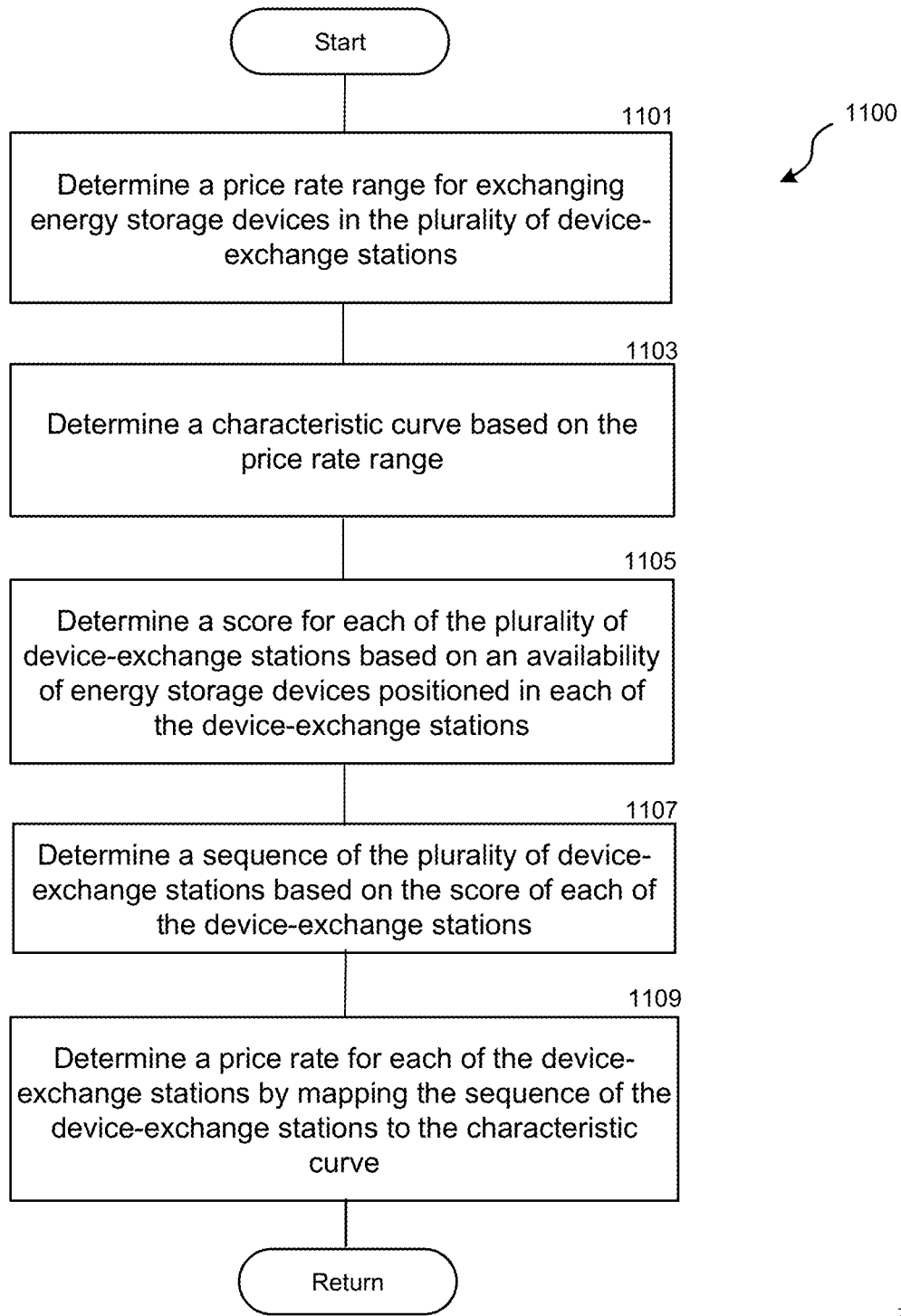
FIG. 1J is a flowchart illustrating a process for setting a battery exchange price based on battery demand information in accordance with embodiments of the disclosed technology.

FIG. 1J is a flowchart illustrating a method 1100 in accordance with embodiments of the disclosed technology. The method 1100 is for managing a plurality of device-exchange stations (e.g., battery-exchange stations). For example, the method 1100 can balance expected demands for energy storage devices (e.g., batteries) in these stations by dynamically adjusting the device-exchange prices at these stations. The method 1100 can be implemented by a server or a server system having a processor (e.g., FIG. 2). For example, at block 1101, the method determines a price rate range for exchanging energy storage devices in the plurality of device-exchange stations. The price rate range has a maximum rate (e.g., rate "1.2" in FIG. 1I) and a minimum rate (e.g., rate "0.8" in FIG. 1I). Once the price rate range is determined, a characteristic curve based on the price rate range can be determined, as shown at block 1103. The characteristic curve indicates a distribution of the price ratings for the plurality of device-exchange stations. In some embodiments, the characteristic curve can be a normal distribution or a "bell curve." In other embodiments, the characteristic curve can be a skewed curve or other suitable distribution.

In some embodiments, the characteristic curve can also be determined based on an "expectation value." As discussed in detail below, the "expectation value" indicates a system operator's pricing strategy. In other words, whether the system operator can expect an additional profit based on a pricing strategy. For example, when the system operator sets the expectation value as "1," the system does not expect to generate any additional profit. If the system operator sets the expectation value higher than "1," then the system operator expects to have some additional profit. If the system operator sets the expectation value lower than "1," then the system operator expects to have less profit (in some embodiments, may lose profit). Embodiments of the expectation value are discussed below with reference to Equation C below. The expectation value determines the "peak" or "center" of the characteristic curve. In the embodiments shown in FIG. 1I, the characteristic curve 151 has a peak 152 slightly above the average price rate "1." In such embodiments, by implementing this pricing strategy, a profit is expected.

At block 1105, the method 1100 continues by determining a score (e.g., the "battery score" discussed above with reference to FIG. 1E) for each of the plurality of device-exchange stations based on the availability of energy storage devices positioned in each of the device-exchange station. In some embodiments, the availability of energy storage devices (which can be reflected by the associated scores) can be an available energy-storage-device count (e.g., in one device-exchange station). In such embodiments, the method 1100 can include determining the available energy-storage-device count based on a difference between a predicted device demand and a predicted device supply. For example, the difference can be "how many batteries are available in the next two hours (e.g., 4 batteries at Station A)" The difference can be calculated based on a predicted battery demand (e.g., 2 battery exchanges are expected in two hours) and a predicted battery supply (e.g., Station A can prepare 6 batteries ready to be picked up in two hours).

At block 1107, the method 1100 continues by determining a sequence of (e.g., ranking or sorting) the plurality of device-exchange stations based on the scores. In some embodiments, the plurality of device-exchange stations can be placed in an order such that stations with higher scores (e.g., more available batteries) have lower ranking (e.g., a higher battery supply results in a lower price rate).

At block 1109, based on the sequence, the method 1100 determines a price rate for each of the device-exchange stations by mapping the sequence of the device-exchange stations to the characteristic curve. For example, assume that (1) there are five Stations A1-A5; (2) the expectation ration is "1," and (3) the maximum rating is "1.2" and the minimum rating is "0.8;" and (4) Stations A1-A5's scores are "5," "4," "3" "2," and "1," respectively. In this embodiment, after mapping the characteristic curve with a normal distribution, Station A5's price rate is "1.2," Station A4's price rate is "1.1," Station A3's price rate is "1," Station A2's price rate is "0.9," and Station A1's price rate is "0.8." By this arrangement, the disclosed system can effectively adjust price rates for each of the device-exchange stations.

In some embodiments, the disclosed system can effectively adjust price rate for each of the device-exchange stations such that most of the stations have price rate at the peak of the characteristic curve. For example, assume that (1) there are ten Stations B1-B10; (2) the expectation ration is "1," and (3) the maximum rating is "1.3" and the minimum rating is "0.7;" and (4) Stations B1-B10's scores are "5," "3," "3," "3," "3," "3," "3," "3," "3," and "1," respectively. In this embodiment, after mapping the characteristic curve with a normal distribution, Station B10's price rating is "1.3," Station B10's price rate is "1.3," Stations B2-B9's price rates are "1," and Station B1's price rate is "0.7."

In some embodiments, the system can adjust the price rate of at least one device-exchange station of the device-exchange stations based on a location of the at least one device-exchange station. For example, Station X is located at an important traffic junction with a high battery demand. Although the battery demand is high, to provide satisfying user experience for users exchanging batteries in Station X, the system can assign a lower price rate to Station X.

In the embodiments discussed above with reference to FIGS. 1I and 1J, the stations can still be divided into various clusters (e.g., based on the factors discussed above with reference to FIG. 1C). For each of the clusters, the disclosed system can generate a characteristic curve. The characteristic curves for different clusters can be different (e.g., with different price rate ranges).

Generally speaking, the present disclosure includes two sets of embodiments for managing multiple device-exchange stations. The first set of embodiments (those discussed with reference to FIGS. 1C-1H) consider multiple clusters and each of the clusters has a characteristic curve. This first approach may need more computing resources but can provide a more detailed result. The second set of embodiments (those discussed with reference to FIGS. 1I and 1J) utilize a simplified approach by generating the characteristic curve based on a normal distribution curve. This second approach provides a quick, convenient scheme for managing multiple device-exchange stations.

Although using different approaches, the two sets of embodiments share the same concept in most of the calculations. For example, when calculating the battery score, the first set of embodiments use the methods discussed in FIG. 1E. As shown in FIG. 1E, the battery score is considered as "0" before the battery's SoC reaches 75%. This is because it usually takes a half to one hour to charge a battery from 75% to 90%, and therefore a battery with SoC lower than 75% cannot be considered as readily available. Similarly, In the second set of embodiments, the battery scores of the batteries are also determined based on their SoCs (using a simplified approach by setting an SoC threshold to determine whether a battery is "available.").

Another aspect of the present technology is that it incentivizes a user to exchange a battery at a particular location by a dynamic pricing strategy generated based on the battery demand characteristic functions mentioned above. FIG. 1A is a schematic diagram illustrating an incentivized battery exchange system in accordance with embodiments of the disclosed technology.

As shown in FIG. 1A, a battery exchange station 10 can includes 6 batteries 11A, 11B, 12A, 12B, 13A, and 13B positioned therein. The battery exchange station 10 also includes two empty slots A, B for a user to insert batteries. During a regular battery exchange event, a user can insert up to two empty batteries in the slots A, B and then take away two fully charged batteries (or nearly fully charged batteries, or batteries with higher SoC than an inserted battery) from the battery exchange station 10. In some embodiments, the battery exchange station 10 can be configured to only allow certain types of batteries to be inserted (e.g., batteries with less than 40% charged) or taken out (e.g., batteries that are more than 80% charged).

In the embodiments illustrated in FIG. 1A, the batteries 11A, 11B are 50% charged. The batteries 12A, 12B are 30% charged. The batteries 13A, 13B are 39% charged. In other words, currently there are no available batteries (with more than a 50% charge) for a user to swap. Based on the battery demand prediction for station 10, the system can generate a predicted battery demand for battery exchange in the near future. For example, the predicted demand for battery exchange can be generated based on historical data. In some embodiments, the predicted demand can be generated based on a machine learning process (e.g., to figure out the weightings of various associated factors and then accordingly predict a future demand). In some embodiments, the predicted demand for battery exchange can be a predicted demand for the next 12 or 24 hours. In response to the predicted battery demand, the present system can send a notice to battery users/holders (e.g., via a push notice through an app installed in a user's mobile device), asking them to trade in their charged batteries for credits, cash, or other bonus points (e.g., generated based on the corresponding characteristic functions mentioned above). For example, an incentivized user can bring in two 80% charged batteries 15A, 15B to the station 10 (e.g., insert them in slots A, B) and then take away the two 50% charged batteries 11A, 11B. Although the batteries 11A, 11B are only 50% charged, they may be sufficient for the incentivized user's needs (e.g., a short range commuter). By this arrangement, the present system can quickly balance available energy (e.g., stored in batteries) among multiple battery exchange stations by a dynamic pricing process. Embodiments of the notice to the users are described below with reference to FIG. 4A-5C.

The disclosed system can predict demands for exchangeable energy storage devices (e.g., batteries) in a real-time or near real-time manner. The disclosed technology collects information from multiple sources (e.g., battery exchange stations, electric vehicles, batteries, user mobile devices, etc.), analyzes the same, and generates reference information that can be used to predict demands for exchangeable energy storage devices for an exchange station during a particular time period. The collected information can include, for example, the locations of sampling stations (e.g., the sampling stations can be selected from all of the multiple battery exchange stations coupled to a server and managed by an operator), events nearby the sampling stations, environmental conditions close to the sampling stations, and user behavior (e.g., battery usage, user driving/riding history, user behavior, user habits, etc.) associated with the sampling stations. After analyzing the collected information, the system determines or identifies characteristics or power consumption patterns for various types of battery exchange stations. The determined or identified characteristics/patterns can then be used as guidance to determine the type of stations (which can be used as a factor during the station clustering process mentioned above).

Figure 7A:
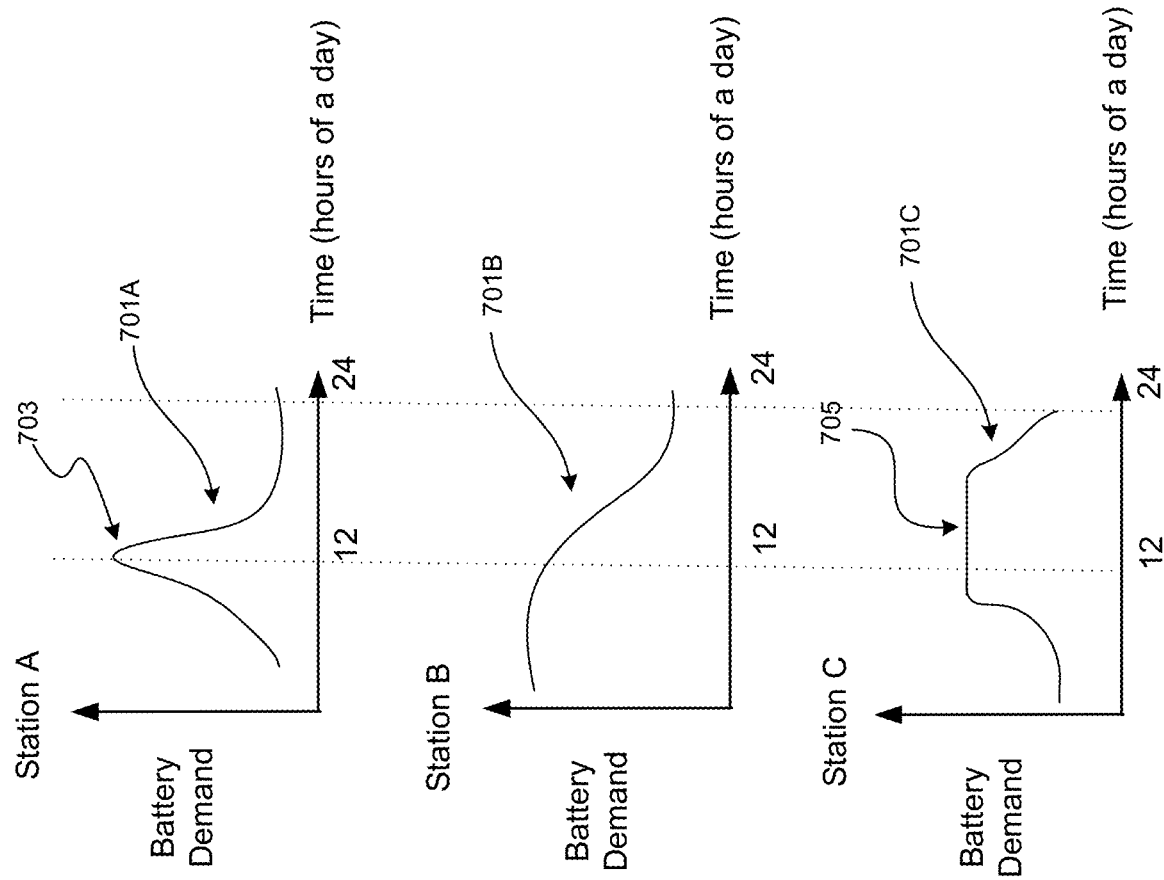
FIG. 7A is a schematic diagram illustrating characteristics of multiple station systems in accordance with embodiments of the disclosed technology.

In some embodiments, the present disclosure can categorize the sampling stations based on their locations. For example, the sampling stations can be characterized as a "heavy-traffic" type, an "intermediate-traffic" type, or a "light-traffic" type based on the distances between a main traffic artery/road and the sampling stations. In some embodiments, the "heavy-traffic" type stations can be defined as stations within 1 kilometer of the main traffic artery, the "intermediate-traffic" type stations can be defined as stations ranging from 1 kilometer to 5 kilometers from the main traffic artery, and the "light-traffic" type stations can be defined as stations having at least 5 kilometers away from the main traffic artery. The present disclose can further identify battery demands for each type of stations during a particular period of time (e.g., within a day, as shown in FIG. 7A).

In some embodiments, the battery demands can be described as the minimum number of fully-charged (or substantially-fully-charged) batteries necessary to satisfy all users who want to exchange batteries during the particular period of time. For example, the disclosed system may determine that Station A needs to have 123 fully-charged batteries available during 8 a.m. to 11 a.m. on Mondays. In some embodiments, the battery demands can be described as the minimum amount of power (e.g., charging current in amperes, A) that is necessary to charge/maintain the minimum number of required fully-charged batteries before/during the particular period of time. For example, the disclosed system can determine that, to enable Station A to provide 123 fully-charged batteries during 8 a.m. to 11 a.m., the required charging current is 500 A supplied from 5 a.m. to 7:30 a.m. on the same day.

Once the battery demands are determined for each type of sampling stations (e.g., the "heavy-traffic" type, an "intermediate-traffic" type, or a "light-traffic" type mentioned above), the disclosed system can further use such information to predict a battery demand for a target battery exchange station. For example, the target battery exchange station can be a newly-deployed station within 1 kilometer from a heavy-traffic street similar to the main traffic artery mentioned above. In such embodiments, the present disclosure can use the determined battery demands (e.g., described as demand curves shown in FIGS. 7A and 7B, or in other characteristic forms or patterns) to determine how to operate the target battery exchange station (e.g., how to charge/maintain the batteries therein during particular periods of time). By this arrangement, the present disclosure enables an operator to maintain or control a battery exchange station in an energy-efficient manner.

In some embodiments, the disclosed system may also categorize the sampling stations based on surrounding environmental conditions (e.g., close to a tourist attraction or an office building) and/or particular events (e.g., natural events such as typhoon, hurricane, severe weather conditions, cold/heat waves etc., or contrived events such as a professional sports game, special sales events, etc.). For example, the sampling stations can be characterized as a "city-commuter" type, a "tourist-attraction" type, or an "event-driven" type based on the surrounding environmental conditions. For example, the "city-commuter" type can have a battery demand pattern that has a high demand during peak commuting hours. As another example, the "tourist-attraction" type can have a battery demand pattern that has a high demand during holidays or weekends. Similarly, the "event-driven" type can have a battery demand pattern that has a high demand during the events.

In some embodiments, the disclosed system may further categorize the sampling stations based on user behavior (e.g., the time, location, and frequency that a user exchanges a battery, a user's driving/riding habits, a user's routes for operating a vehicle, etc.) associated with the sampling stations. For example, the sampling stations can be characterized as a "grocery-shopper" type, a "street-racer" type, or a "mountain-climber" type based on the surrounding environmental conditions. For example, the "grocery-shopper" type can have a battery demand pattern that indicates frequent short-distance travels of users to a particular location (e.g., a grocery store). The "street-racer" type can have a battery demand pattern that indicates its users are prone to hit a full throttle when staring their vehicles (e.g., the station is close to a professional racing track). The "mountain-climber" type can have a battery demand pattern that indicates its users are prone to take uphill routes when operating their vehicles (e.g., the station is close to an entrance of a mountain scenic pass).

In some embodiments, the disclosed system may use machine learning techniques to enhance the accuracy of the battery demand predictions performed. In some examples, the disclosed system may use supervised machine learning techniques (e.g., to verify the result of the training and provide feedback) to improve the accuracy. In some embodiments, the disclosed system may use unsupervised machine learning techniques (e.g., to enable the system to independently figure out how to train and improve) to improve the accuracy.

Another aspect of the present disclosure is to provide an updated battery demand reference at all time (or, in a real-time or near real-time manner). For example, when a new user subscribes to a battery plan that enables the user to exchange batteries in existing battery exchange stations, the disclosed system may determine a type of the new user and identify a corresponding battery demand pattern accordingly. For example, the new user can be identified as a "high-demanding" type at least because the new user purchases a "high-performance" battery package. In such embodiments, the present system will take into account the impact of the new user in its future analysis and prediction based on the identified type. In some embodiments, similarly, when a new battery exchange station is deployed, the present system will also take into consideration of its impact in its future analysis and predictions. As a result, the disclosed system is capable of providing most updated and thus most accurate analysis result for battery demand prediction. In other embodiments, the disclosed system can update battery demand information periodically.

In some embodiments, the disclosed system enables each of the battery exchange stations to be operated "offline." In such embodiments, the present disclosure provides a set default rules and patterns for each of the battery exchange stations to follow, provided that the battery exchange stations do not receive further (or updated) instructions from a server. For example, some stations may be at a place where a network connection can be interrupted from time to time. In these cases, these stations can still function properly when they are offline (e.g., not connected to the server). The disclosed system can also set up a set of rules regarding "aging instructions" for these stations to follow. For example, the disclosed system instructs theses stations to follow the previous instructions transmitted by the server as long as the previous instructions were created no more than 2 hours ago. Once the 2-hour threshold is met, these stations can go back to default demand patterns that are stored in these stations. In other embodiments, the rules and the time threshold can vary depending on various factors such as the locations/types of the stations.

In some embodiments, the disclosed system may predict a battery demand based on a user request or one or more triggering events. Embodiments of the triggering events include, for example, a power outage, a surge of battery demand that was not considered by the system as a factor in its previous predictions, an accident, a natural disaster, etc. In such embodiments, the system can initiate a prediction analysis in response to the triggering event and transmit the analysis result to the multiple stations.

This disclosed system describes systems and methods designed to provide battery demand predictions and dynamic pricing strategies in a real-time or near real-time manner. Various embodiments may provide one or more of the following technological improvements: (1) efficient real-time or near real-time battery demand prediction and dynamic pricing adjustment; (2) the ability to effectively and dynamically balance energy (e.g., stored in batteries) among multiple battery exchange stations by setting up pricing for battery exchange; and (3) the ability to provide enhanced user experiences by offering satisfying battery experience in an energy-efficient fashion.

In the following description, for the purposes of explanation, numerous specific details are set forth in order to provide a thorough understanding of embodiments of the present technology. It will be apparent, however, that embodiments of the present technology may be practiced without some of these specific details.

Figure 7B:
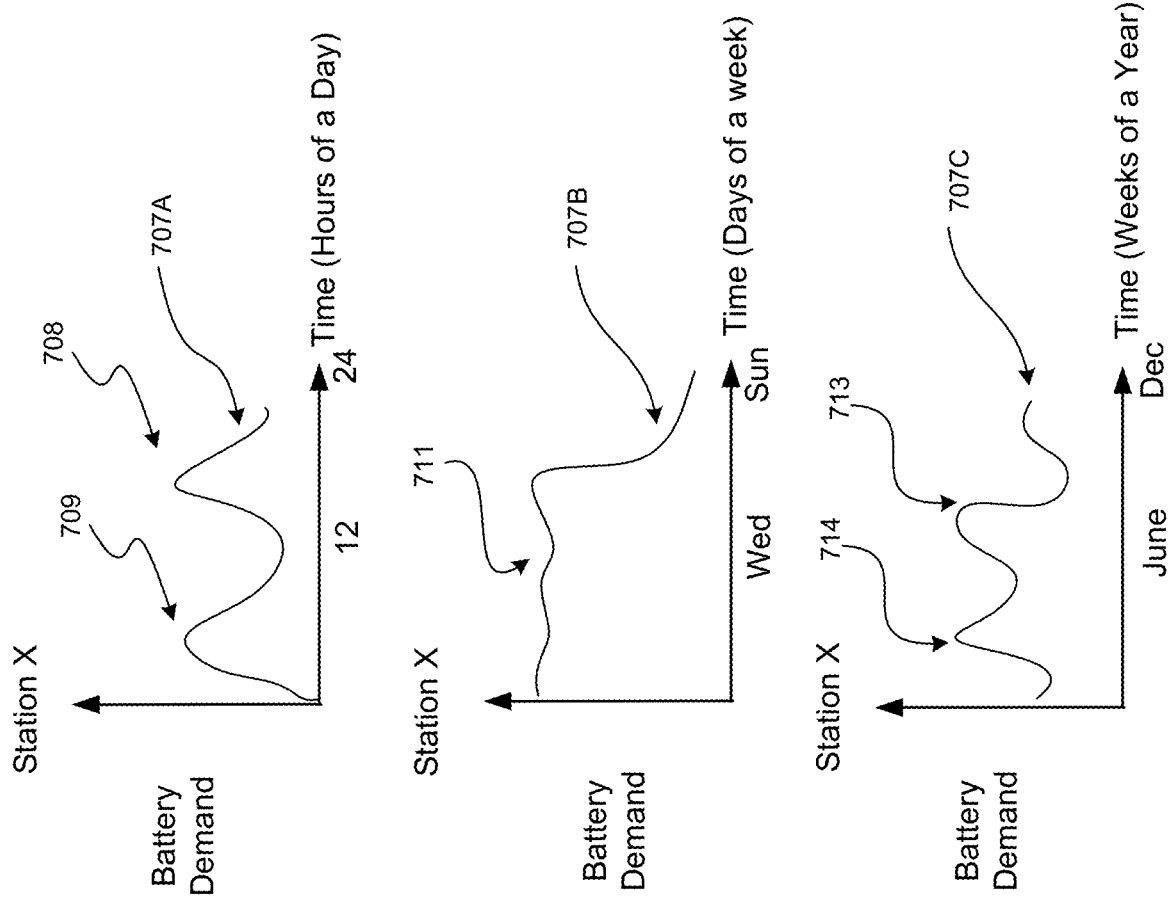
FIG. 7B is a schematic diagram illustrating characteristics during multiple time frames of a station system in accordance with embodiments of the disclosed technology.

FIG. 1B is a schematic diagram illustrating a system 100 in accordance with embodiments of the disclosed technology. As shown, the system 100 includes one or more battery exchange stations 101A-D, a main server 103, a database 105, and a network 107. As shown, the battery exchange stations 101A, 101D are wirelessly coupled to the main server 103 via the network 107. The battery exchange stations 101B, 101C are coupled to the main server 103 via the network 107 via wired connections. The main server 103 is further coupled to the database 105, which can store reference information (e.g., battery demand reference information as shown in FIGS. 7A and 7B).

Using the battery exchange station 101A as an example, in the illustrated embodiment, the station 101A can include a battery exchange rack 113 and a user interface 115 (e.g., a display) positioned thereon. As shown, the battery exchange rack 113 can include eight battery slots 117*a-h* to accommodate batteries. During operation, there are only six battery slots (e.g., slots 117*a*, 117*b*, 117*d*, 117*e*, 117*f*, and 117*h*) are occupied by batteries, and the remaining two slots (e.g., slots 117*c* and 117*g*) are reserved for a user to insert batteries to be exchanged (e.g., low power or depleted batteries). In some embodiments, the battery exchange stations 101A-D can have different arrangements such as different numbers of racks, displays, and/or slots. In some embodiments, the battery exchange stations 101A-D can include modular components (e.g., modular racks, modular displays, etc.) that enable an operator to conveniently install or expand the battery exchange stations 101A-D. The battery exchange stations 101A-D can be electrically coupled to one or more power sources (e.g., power grid, power lines, power storage device, etc.) to receive electric power to charge the batteries positioned therein and to perform other operations (e.g., to communicate with the main server 103).

In some embodiments, the main server 103 can be an edge server that receives client requests and coordinates fulfillment of those requests through other servers, such as servers 109A-C. The servers 109A-C are further coupled to databases 111A-C. Although each of the main server 103 and the servers 109A-C is displayed logically as a single server, these servers can each be a distributed computing environment encompassing multiple computing devices located at the same or at geographically disparate physical locations.

In some embodiments, the main server 103 and the servers 109A-C can each act as a server or client to other server/client devices. As shown, the main server 103 connects to the database 105. The servers 109A-C can each connect to one of the databases 111A-C. As discussed above, each of the main server 103 and the servers 111A-C can correspond to a group of servers, and each of these servers can share a database or can have its own database.

The databases 105, 111A-C store information associated with the disclosed system (e.g., information collected by the main server 103, information analyzed by the main server 103, information generated by the main server 103, reference information, user account information, user battery plans, user histories, user behavior, user habits, etc.). In some embodiments, some of the information stored may come from publicly accessible databases (e.g., weather forecast database, travel alert database, traffic information database, location service database, map database, etc.) maintained by government or private entities. In some embodiments, some of the information stored may come from private databases that provide proprietary information (e.g., user account, user credit history, user subscription information, etc.).

In the illustrated embodiments, the main server 103 is configured to collect information regarding battery demands from the battery exchange stations 101A-D. For example, the collected information can include one or more of, (1) the locations of the battery exchange stations 101A-D; (2) the numbers of the batteries located in the battery exchange stations 101A-D; (3) the numbers/locations of the batteries not located in the battery exchange stations 101A-D (e.g., the batteries are currently installed in vehicles or otherwise held or stored by users); (4) the status of charge of the above-mentioned batteries; (5) the usage histories of the batteries; (6) events close to the battery exchange stations 101A-D; (7) environmental conditions close to the battery exchange stations 101A-D; (8) user behavior (e.g., battery usage, user driving/ridging history, user behavior, user habits, etc.) associated with the sampling stations or the batteries; and/or (9) other suitable information.

After collecting such information, the main server 103 then analyzes the collected information to identify characteristics or patterns for the battery exchange stations 101A-D. For example, the main server 103 can determine one or more battery demand characteristics/patterns based on the analysis. The determined characteristics/patterns can then be used as guidance for operating the battery exchange stations 101A-D or for operating other battery exchange stations coupled to the main server 103. The determined characteristics/patterns can also be used to generate battery pricing strategies (e.g., the incentivized battery exchange mentioned above with reference to FIG. 1A) for the battery exchange stations 101A-D. Embodiments regarding operations of the main server 103 are discussed below with reference to FIG. 2.

The network 107 can be a local area network (LAN) or a wide area network (WAN), but it can also be other wired or wireless networks. The network 107 can be the Internet or some other public or private network. The battery exchange stations 101A-D can be connected to the network 107 through a wired or wireless network interface. While the connections between the main server 103 and the servers 109A-C are shown as separate connections, these connections can be any kind of local, wide area, wired, or wireless network, including the network 107 or a separate public or private network. In some embodiments, the network 107 includes a secure network that is used by a private entity (e.g., a company, etc.).

FIG. 1C is a schematic diagram illustrating a clustering process for dividing battery demand information (e.g., a set of historical battery exchange demand data collected from multiple battery stations) into multiple clusters in accordance with embodiments of the disclosed technology. The clustering process is used to divide collected (or analyzed) battery demand information into multiple clusters for further battery-pricing analysis. As shown in FIG. 1C, the disclosed technology can divide collected battery demand information into multiple clusters based on different time periods. For example, during weekdays, the present technology can divide all the time periods into five levels (levels 1-5). As shown, the present technology can divide all the time periods during weekends into three levels (levels 6-8). Each level can represent different battery demand level (e.g., different battery exchange counts).

For example, the "Level 1" cluster can represent battery stations that have 400-500 battery exchange counts in certain time interval during weekdays (e.g., the battery stations near a main train station with time interval from 9 a.m. to 10 a.m.). For example, the "Level 6" cluster can represent battery stations that have 100-300 battery exchange counts in certain time interval during weekends (e.g., the battery stations near a bus stop with time interval from 4 p.m. to 5:15 p.m.; or the battery stations near a suburban gas station with time interval from 7 p.m. to 8 p.m.). As shown, there are eight clusters of battery demands after the clustering process shown in FIG. 1C.

FIG. 1D is a schematic diagram illustrating a visualized clustering analysis in accordance with embodiments of the disclosed technology. As shown in FIG. 1D, the clustering is designed to determine multiple 2-dimensional representative points (e.g., points $C_1$, $C_2$ and $C_3$ shown in FIG. 3D) from multiple 2-dimensional data points (e.g., generated based on collected or analyzed data). In the illustrated example, the $X_1$ axis can represent "time periods" and the $X_2$ axis can represent "number of available batteries" or "types of the battery stations." The disclosed system can select other factors to perform the clustering analysis. For example, in some embodiments, the $X_1$ axis can represent "number of battery exchanges" and the $X_2$ axis can represent "number of available batteries." The clustering process discussed in the present technology can determine most suitable representative points for the generated data points. In some embodiments, the clustering process can be performed in multiple (e.g., more than two) dimensions.

In some embodiments, the clustering process can be performed based on a K-means algorithm. An example objective equation of the K-means algorithm is shown as Equation (A) below. In Equation (A), the terms "$C_1$-$C_k$" represent the clusters to be determined, the term "$X_{ij}$" are factors to be considered, and the parameters "i, i', j, and p" are calculation variables. By minimizing the objective equation below, suitable clusters $C_1$-$C_k$ and elements therein can be determined.

$$\underset{C_1,\ldots,C_K}{\text{minimize}}\left\{\sum_{k=1}^{K}\frac{1}{|C_k|}\sum_{i,i'\in C_k}\sum_{j=1}^{p}(x_{ij}-x_{i'j})^2\right\} \quad (A)$$

FIG. 1E is a schematic diagram illustrating a battery score described in accordance with embodiments of the disclosed technology. As mentioned above, the "battery score" can be used to determine an energy ratio for determining characteristic functions ($f_c$). The battery score can be defined as the battery energy level (e.g., state of charge, SoC) of a battery when the battery is exchanged (e.g., removed by a user from a battery exchange station). As shown in FIG. 1E, the battery score can be used to evaluate the SoC of the batteries in a battery exchange station (e.g., by giving the batteries some "ratings"). As described herein, the battery score and the battery count (discussed above) are indexes to identify a current charging status or a battery availability of each battery exchange station. These indexes are informative for the system to know its current battery supply situation and enable the system to dynamically adjust the price rate accordingly. In some embodiments, the battery count can be obtained from a straightforward observation.

As shown in FIG. 1E, a battery score curve or line 121 indicates the relationship between the battery energy level (shows as SoC in percentage) and the battery score. For example, the battery score is "1" when the SoC is more than 90% (e.g., batteries with SoC higher than 90% can be characterized as "available" batteries, which are ready for a user to pick up and use, and therefore have a relatively high battery score). For the SoCs from "90%" to "82%," the corresponding battery scores decrease proportionally from "1" to "0.3" (e.g., these batteries need to be charged so as to become "available" batteries, and therefore have an intermediate battery score). For the SoCs from "82%" to "75%," the corresponding battery scores decrease proportionally from "0.3" to "0." When the SoC is less than 75%, the battery score is "0" (e.g., these batteries need to be charged for a longer time to become "available" batteries and therefore have a relatively low battery score). In such embodiments, the 75% SoC can be a battery quality threshold that indicates the lowest charged level of batteries that a user can get from a battery station (e.g., to maintain user's battery experiences and service quality by not providing insufficiently charged batteries). In other embodiments, the battery score can be defined differently based on a machine learning process or by considering other suitable factors.

In some embodiments, the energy ratio can be defined as a ratio of a "sum of the battery score" to a "battery count." In some embodiments, the "battery count" can mean the number of batteries at the battery exchange station. For example, the battery count can be "6" if a battery exchange station has six batteries on its rack (i.e., no matter whether these batteries are "available" for a user to swap or not). In other embodiments, however, the "battery count" can mean the number of available batteries at the battery exchange station. For example, the battery count can be "3" if a battery exchange station has three fully-charged batteries available for a user to swap. As another example, the battery count can be "6" if a battery exchange station has six 90% charged batteries available for a user to swap.

In some embodiments, the energy ratio can be determined based on Equation (B) below. In Equation (B) below, the battery count is further deducted by "prediction counts" which can be determined based on predicted battery demands (e.g., generated based on battery station types shown in FIGS. 7A and 7B) or user reservations. As a result, the energy ratio (which is derived from the battery count, the prediction count, and the battery score) can be considered a normalized, weighted index that is indicative and useful for determining dynamic battery exchange price rates. It is noted that the calculation of energy ratio may vary (e.g., different from equation (B)) due to practical needs or new simulation results.

$$EnergyRatio = \frac{TotalBatteryScore}{TotalBatteryCounts - PredictionCounts} \quad (B)$$

FIG. 1F is a schematic diagram illustrating using a genetic algorithm (GA) to determine battery demand characteristic functions ($f_c$) in accordance with embodiments of the disclosed technology. The battery demand characteristic functions can then be used to determine a battery pricing strategy (e.g., details are discussed with reference to FIG. 1G). The GA can be used to determine suitable characteristic functions for each determined cluster (e.g., $f_{c1}$-$f_{c5}$ shown in FIG. 1G, which respectively correspond to Level 1-5 shown in FIG. 1C). As shown, the present technology can use the clustered battery demand information as "initial population" (block 131), then evaluate its "fitness F" (block 133). The "fitness F" is defined in Equation (C) below. The term "ExpRatio" refers to the "expectation value" or an "expectation ratio," which corresponds to a system operator's pricing strategy. For example, when the system operator sets the expectation ratio as "1," the system does not expect to generate any additional profit based on the dynamic pricing strategies discussed herein. If the system operator sets the expectation ratio as "1.2," then the system expects to an additional 20% profit based on the dynamic pricing strategies. In this embodiment, the time interval is set as 1 hour, and the term "exchange$_{vm\_}^{hour}$" refers to the "number of battery exchanges per hour in a battery station." The term "VM" stands for battery "vending machine" (e.g., the battery exchange station).

$$F = \left| \frac{\sum_{C_i \in Clusters} \sum_{vm \in C_{i\_vm}} \sum_{hour \in C_{i\_hour}} (f_{C_i}(\text{energy\_ratio}_{vm\_hour}) \times \text{exchange}_{vm\_hour})}{\sum_{C_i \in Clusters} \sum_{vm \in C_{i\_vm}} \sum_{hour \in C_{i\_hour}} (\text{exchange}_{vm\_hour})} - \text{ExpRatio} \right| \quad (C)$$

Characteristic function ($f_c$) is a variable function that the disclosed system determines. The term "exchange$_{vm\_}^{hour}$" is historical data or predicted demand information that the disclosed system uses to feed in the fitness function F. In some embodiments, the term "exchange$_{vm\_}^{hour}$" can be determined or "trained" through a machine learning process. If the system finds the characteristic functions (fc) for every clusters and determines that the "fitness F" equals (or is close to) zero (or other constant), then the present system can determine that F is converged (block 135). Then the suitable characteristic functions ($f_c$) can be determined (block 137). If not, the present system will go through a selection process (block 139) and a recombination process (block 141, including crossover and mutation processes) to generate a new "population" for further evaluation (go back to block 133). In other embodiments, other suitable machine learning algorithms or techniques can be used to determine the characteristic functions. The fitness function F disclosed herein is only an example to show how to analyze historical data based on a genetic algorithm to obtain desired characteristic functions (fc). In other embodiments, the fitness function F can be in different forms depending on practical considerations or other calculation factors. For example, the fitness function F can be a multi-objective genetic algorithm (MOGA) or multi-objective optimization algorithm (MOOA). For example, the fitness function F can be:

$$F = (f_1, f_2) = w_1 f_1 + w_2 f_2 \quad (D)$$

In other words, the fitness function F in equation (C) is trained and optimized for one purpose (i.e., the expectation ratio), whereas the fitness function F in equation (D) can be trained and optimized for one or more purposes while giving a weighting to each purpose. For example, a sub-fitness-function $f_1$ can be set to approximate the desired expectation ratio as described in equation (C), and another sub-fitness-function $f_2$ can be optimized for another purpose (e.g., the shortest distance to downtown, lowest power cost in corresponding time intervals at a location, etc.). $W_1$ and $W_2$ are weighting values that can be set by a system operator.

FIG. 1G is a schematic diagram illustrating multiple battery demand characteristic functions in accordance with embodiments of the disclosed technology. As shown in FIG. 1G, five battery demand characteristic functions $f_{c1}$-$f_{c5}$ are determined based on clustering and the GA calculation process mentioned above. The battery demand characteristic functions $f_{c1}$-$f_{c5}$ can be used to determine a dynamic pricing strategy. For example, for the battery stations in cluster 1, the system can use battery demand characteristic function $f_{c1}$ to determine how to set up the price (e.g., between the maximum and minimum rates) based on a given energy ratio (which can be determined by individual battery station and transmitted to a server). By this arrangement, the present technology can dynamically set a battery exchange price so as to achieve energy efficiency (e.g., to balance the energy among multiple battery exchange stations) without compromising users' battery experiences. In some embodiments, the disclosed system uses the battery demand characteristic functions to determine a battery exchange price rate for multiple battery exchange stations.

For example, if the system predicts that there will be a high demand at battery station A in this time interval, the system would put battery station A in this time interval into Cluster 5 (e.g., Level 5) and have the dynamic price rate fits with the characteristic function $f_{c5}$, so that the dynamic price rate would get high easily if the energy ratio is decreased. For example, the dynamic price rate might change from 0.9 to 1.2 after an event that one fully charged battery has been swapped out by a user. In some embodiments, the dynamic price rate of battery station A in another time interval (e.g., being clustered as Cluster 1) would only change from 0.9 to 0.95. As the battery exchange price rate for Station A increases, the battery demand may decrease (e.g., a user originally plans to swap a battery there decides not to exchange it during the high-demand time) or the battery supply may increase (e.g., a user can "trade in" his fully charged battery at Station A for credit, cash, bonus points, etc.) In some embodiments, the dynamic price rate for a battery "sell-out" event (e.g., to motivate battery users to take batteries from a low-demand station) and a battery "trade-in" event (e.g., to motivate battery users to turn in qualified batteries to a high-demand station) might be related or proportional to each other but not exactly the same.

Figure 2:
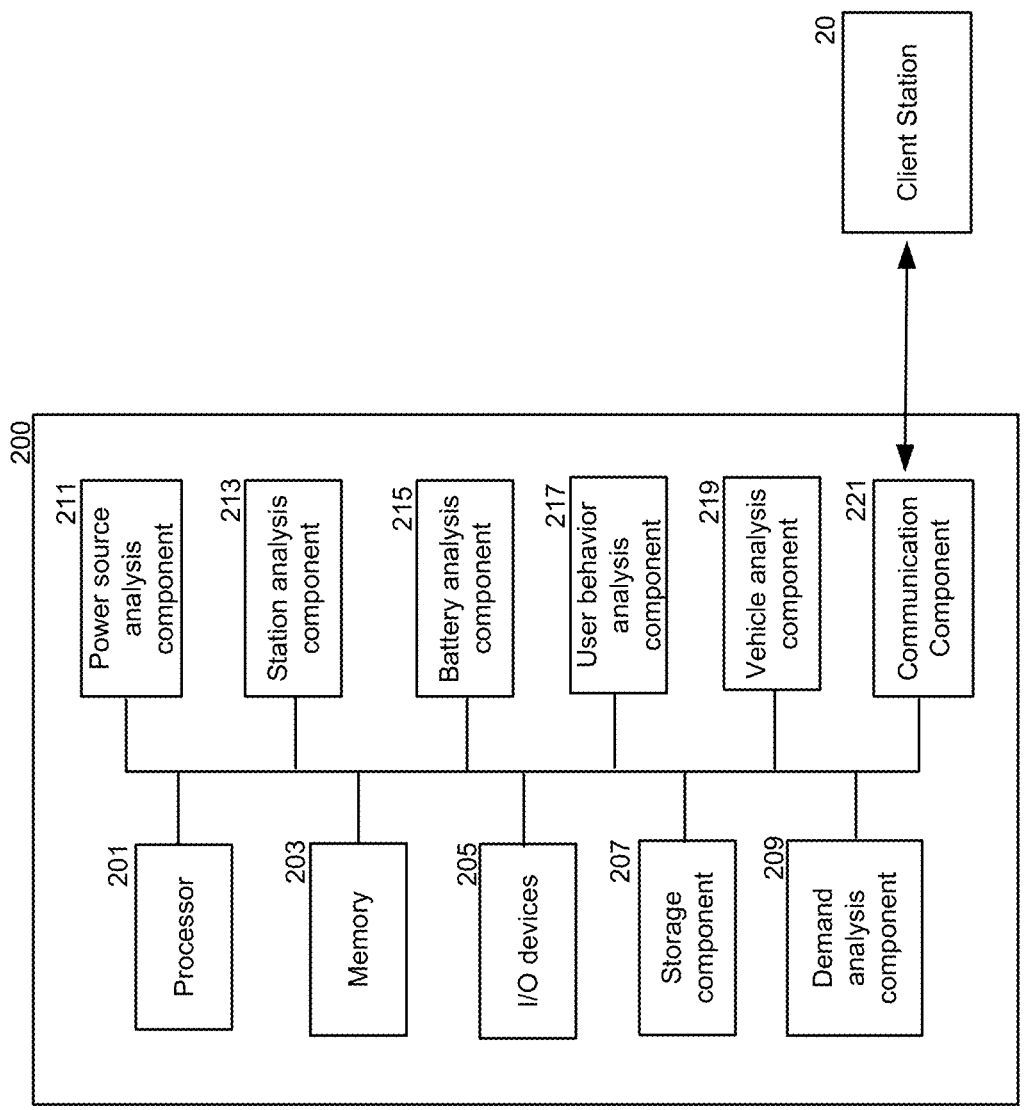
FIG. 2 is a schematic diagram illustrating a server system in accordance with embodiments of the disclosed technology.

FIG. 2 is a schematic diagram illustrating a server system 200 in accordance with embodiments of the disclosed technology. The server system 200 is configured to collect information associated with multiple batteries that can be deployed or managed by the system 200. The server system 200 is also configured to analyze the collected information and transmit, based on the analysis, a signal or an instruction to a client station 20 to control a process (e.g., a charging process) therein. In some embodiments, the client station 20 can be implemented as the battery exchange stations 101A-D discussed above.

As shown in FIG. 2, the server system 200 includes a processor 201, a memory 203, input/output (I/O) devices 205, a storage component 207, a demand analysis component 209, a power source analysis component 211, a station analysis component 213, a battery analysis component 215, a user behavior analysis component 217, a vehicle analysis component 219, and a communication component 221. The processor 201 is configured to interact with the memory 203 and other components (e.g., components 205-221) in the server system 200. In some embodiments, the processor 201 can be a single processing unit or multiple processing units in a device or distributed across multiple devices. The processor 201 can be coupled to other hardware devices, for example, with the use of a bus, such as a PCI (Peripheral Component Interconnect) bus or SCSI (Small Computer System Interface) bus. The processor 201 can communicate with a hardware controller for devices, such as for the components 205-221.

The memory 203 is coupled to the processor 201 and is configured to store instructions for controlling other components or other information in the server system 200. In some embodiments, the memory 203 can include one or more of various hardware devices for volatile and non-volatile storage and can include both read-only and writable memory. For example, the memory 203 can comprise random access memory (RAM), processor registers, read-only memory (ROM), writable non-volatile memory, flash memory, device buffers, and so forth. The memory 203 is not a propagating signal divorced from underlying hardware and accordingly is non-transitory. The memory 203 can further include a program memory that stores programs and software, such as an operating system. The memory 203 can also include a data memory that can store information associated with the server system 200.

The I/O devices 205 are configured to communicate with an operator (e.g., receive an input therefrom and/or present information thereto). In some embodiments, the I/O devices 205 can be one component (e.g., a touch screen display). In some embodiments, the I/O devices 205 can include an input device (e.g., keyboards, pointing devices, card reader, scanner, camera, etc.) and an output device (e.g., a display, network card, speaker, video card, audio card, printer, speakers, or other external device).

The storage component 207 is configured to store, temporarily or permanently, information/data/files/signals associated with the server system 200 (e.g., collected information, reference information, information to be analyzed, analysis results, etc.). In some embodiments, the storage component 207 can be a hard disk drive, flash memory, or other suitable storage means. The communication component 221 is configured to communicate with other systems (e.g., the client station 20 or other stations) and other devices (e.g., a mobile device carried by a user, a vehicle, etc.).

The demand analysis component 209 is configured to collect and store (e.g., in the storage component 207) information to be analyzed. The collected information can include (1) the locations of multiple sampling stations (e.g., in some embodiments, including the client station 20; in other embodiments, however, not including the client station 20); (2) the numbers of the batteries located in the multiple sampling stations; (3) the numbers and locations of the batteries not located in the multiple sampling stations; (4) information regarding battery manufacturers, production dates/batches, the number of charging cycles that a battery has gone through, working temperatures that a battery has experienced, charging/discharging energy amount/rates of batteries, full/current charging capacities of the batteries, and/or other suitable battery information; (5) activities or events that can potentially change users' battery experience (e.g., the way users utilize/exchange batteries); (6) environmental conditions that can potentially change users' battery experience; and/or (7) user profile information regarding user battery plans user driving/riding histories, user behavior, user habits, etc. After receiving the collected information, the demand analysis component 209 can analyze the collected information. Each type of collected information above is analyzed to identify characteristics/patterns for this particular type of collected information (e.g., in a form of characteristic curves shown in FIGS. 7A and 7B, to be discussed in detail below). These identified characteristics/patterns can be considered, individually or in combination, by the demand analysis component 209 to generate a battery demand prediction for the client station 20.

The demand analysis component 209 is also configured to perform the clustering process (e.g., FIGS. 1C and 1D), generate the battery demand characteristic functions based on a machine learning process (e.g., FIGS. 1F and 1G), and then accordingly provide a dynamic battery pricing strategy for the client station 20. The dynamic battery pricing strategy enables a system operator to balance the energy among multiple client stations 20 so as to meet users' battery demand.

In some embodiments, the demand analysis component 209 can prioritize the collected information based on their relative importance or reliability. For example, the demand analysis component 209 can use the "locations of the battery exchange stations" as a primary factor and set other items as secondary factors when determining a battery demand prediction for the client station 20. In such embodiments, the system 200 can identify a daily battery demand curve (e.g., as shown in FIGS. 7A and 7B, to be discussed in detail below) for the client station 20 based on the locations of the sampling stations. The demand analysis component 209 can then consider other secondary factors to adjust the identified daily battery demand curve. For example, the demand analysis component 209 can increase the battery demand prediction if it determines that expected users for the client station 20 are high-demand users, based on the user profile information.

In some embodiments, the demand analysis component 209 gives different types of collected information different weightings. For example, the demand analysis component 209 can set the weightings for the "locations of the stations," the "user behavior," and the "environmental condition" as 50%, 20%, and 30%. In such embodiments, the identified characteristics/patterns for each type of collected information can then be combined based on the foregoing weightings. In some embodiments, the demand analysis component 209 can determine which types of collected information to be included in the prediction based on empirical studies, results of a machine learning process, and/or system operator's preference.

In some embodiments, the demand analysis component 209 determines the priorities or weightings for each type of the collected information based on the reliability of the collected information. For example, for information measured and collected from memories coupled to the batteries, the demand analysis component 209 can give it higher weighting or priority because the system 200 considers such information is direct/internal and thus more reliable than indirect/external information such as environmental conditions (e.g., a weather forecast, an event notice, etc.). In some situation, the indirect/external information can be severe enough such that the system will give it a higher priority (e.g., a typhoon/hurricane approaches, a concert is held close to a battery exchange station, etc.).

In some embodiments, the demand analysis component 209 communicates and work together with other components in the system 200 (e.g., components 211-219) to generate the battery demand prediction for the client station 20. In some embodiments, however, the system 200 can operate without components 211-219.

The power source analysis component 211 is configured to analyze the status (e.g., reliability, stability, continuity, etc.) of one or more power sources that are used to power the client station 20 for charging the batteries therein. For example, the power source analysis component 211 can determine that a power source used to supply power to the client station 20 will be interrupted during 1 a.m. to 3 a.m. on a particular date, and then the power source analysis component 211 can accordingly adjust a charging instruction to the client station 20 based on the battery demand prediction. For example, the original battery demand prediction can indicate that the client station 20 needs 5 fully-charged batteries during 2 a.m. on the particular date. Due to the determined possible power supply interruption, the power source analysis component 211 can instruct the client station 20 to charge the batteries needed prior to 1 a.m. on the particular date.

In some embodiments, the power source analysis component 211 also considers the cost for charging in different time periods. For example, the power source analysis component 211 can determine that the charging cost from a power source is reduced during off-peak hours. The power source analysis component 211 determines whether it is feasible for the client station 20 to charge its batteries during the off-peak hours based on the battery demand prediction from the demand analysis component 209. If so, the power source analysis component 211 can instruct the client station 20 to charge the batteries during these off-peak hours such that to reduce charging costs.

The station analysis component 213 is configured to categorize the multiple sampling stations into various types and identify representative characteristics/patterns for each type, such that the demand analysis component 209 can use such information as basis for its analysis. For example, the station analysis component 213 can analyze the collected information and divide the multiple sampling stations into various types based on the battery demands. For example, the stations can be categorized as "high-demand-all-time," "high-demand-peak-hours," "high-demand-holidays," "high-demand-weekends," "high-demand-events," and "low-demand-all-time." In some embodiments, the "high-demand-all-time" type can indicate that the station is located on a busy street. The "high-demand-peak-hours" type can infer that the station is frequently visited by commuting users during the peak hours. The "high-demand-holidays" type or the "high-demand-weekends" type can indicate that such stations are located at a tourist attraction or a site-seeing point. The "high-demand-events" type can means that the station is located at an event-holding facility or stadium. The "low-demand-all-time" can indicate that the station is a strategic station that is built up as a relay station between two major cities. Based on these types, the demand analysis component 209 and the station analysis component 213 can determines a suitable battery demand prediction to the client station, especially in cases where the collected information is insufficient for the demand analysis component 209 to perform a normal analysis. For example, the demand analysis component 209 and the station analysis component 213 first determines the type of a station and use a typical demand prediction curve for that station.

Similar to the station analysis component 213, the battery analysis component 215, the user behavior analysis component 217, and the vehicle analysis component 219 are also configured to categorize the batteries, user behavior, and vehicles powered by the batteries, respectively, into various types and identify representative characteristics/patterns for each type. For example, the battery analysis component 215 can categorize the batteries based on their manufacturers, ages, original full charging capacities (FCCs), current FCCs, charging cycles, experienced working temperatures, charge/discharge profiles (e.g., steady or having peaks), battery hardware/firmware version, battery cell type, battery SoC, battery cell temperature, battery State-of-Health (SoH), battery age (time in use and/or charging cycle counts), battery circuit temperature, battery error status, battery direct current internal resistance (DCIR), etc. Such types or categories can facilitate the demand analysis component 209 to fine tune its battery demand prediction (and the corresponding charging instructions) for the client station 20, provided the system 200 knows what types of batteries are positioned in the client station 20 (e.g., such information can be provided to the server 200 by the client station 20). For example, if the system 200 knows that the batteries made by manufacturer A requires more charging time than the batteries made by manufacturer B, the system 200 can plan accordingly.

Similarly, the user behavior analysis component 217 can categorize the user behavior based on how they exchange and/or use the batteries. For example, a user can be very demanding on battery performance (e.g., a professional racer). As another example, another user may only use battery to power its vehicle for daily errands (e.g., picking up children or grocery shopping). Once a user reserves a battery at the client station 20, the client station 20 then provides information associated with the reservation to the server system 200. The server system 200 can then determine the type/category of the user made the reservation and accordingly adjust the battery demand prediction (and the corresponding charging instructions) for the client station 20. In some embodiments, such adjustment can be made by the client station 20. For example, if the system 200 knows that the batteries made by manufacturer A perform better for professional-racing users than the batteries made by manufacturer B, the system 200 can plan accordingly.

The vehicle analysis component 219 can categorize the types of vehicles that users are planning to operate. For each type of vehicles, the vehicle analysis component 219 can determine which types of batteries work best for each type of vehicles. For example, the vehicle analysis component 219 can determine that an electric scooter works best with a specific type of battery after a particular charging process. In such embodiments, the vehicle analysis component 219 can work with the demand analysis component 209 to adjust the battery demand prediction (and the corresponding charging instructions), if the server system 200 receives related vehicle information. In some embodiments, such information can be found in the user profiles or account information. In other embodiments, such vehicle information can be provided by the client station 20 to the server system 200. For example, if the system 200 knows that the batteries made by manufacturer A perform better for vehicles X than the batteries made by manufacturer B, the system 200 can plan accordingly.

In some embodiments, the server system 200 can provide the battery demand prediction to the client station 20 in a real-time or near real-time manner. In such embodiments, the server system 200 monitors the status of the client station 20. Once there is a change (e.g., a user just removed two fully-charged batteries and left two empty ones at the client station 20) or a potential change (e.g., a user makes a reservation to exchange batteries at the client station 20) that may affect the charging process of the client station 20, the server system 200 can perform the analysis mentioned above and generate an updated battery demand prediction for the client station 20 to follow. In some embodiments, the change or potential change can be transmitted to the server system 200 from a mobile device (e.g., a user uses an app installed thereon to make a battery reservation), another server (e.g., a web-service server associated with an app used by a user), and/or the client station 20.

In some embodiments, the client station 20 can be a new client station (e.g., not included in the sampling stations). In such embodiments, the server system 200 can generate the battery demand prediction based on previously collected information and/or previously analysis performed by the server system 200 (e.g., as reference information). For example, the server system 200 can determine that the client station 20 can be a certain type of station (e.g., the "heavy-traffic" type, the "intermediate-traffic" type, the "light-traffic" type, the "city-commuter" type, the "tourist-attraction" type, the "event-driven" type, etc.) and then generate the battery demand prediction based on the determined type.

In some embodiments, the server system 200 can manage multiple client stations simultaneously. In such embodiments, the server system 200 can monitor these client stations, collect information therefrom, and generate the battery demand prediction for each of the client stations.

Figure 3:
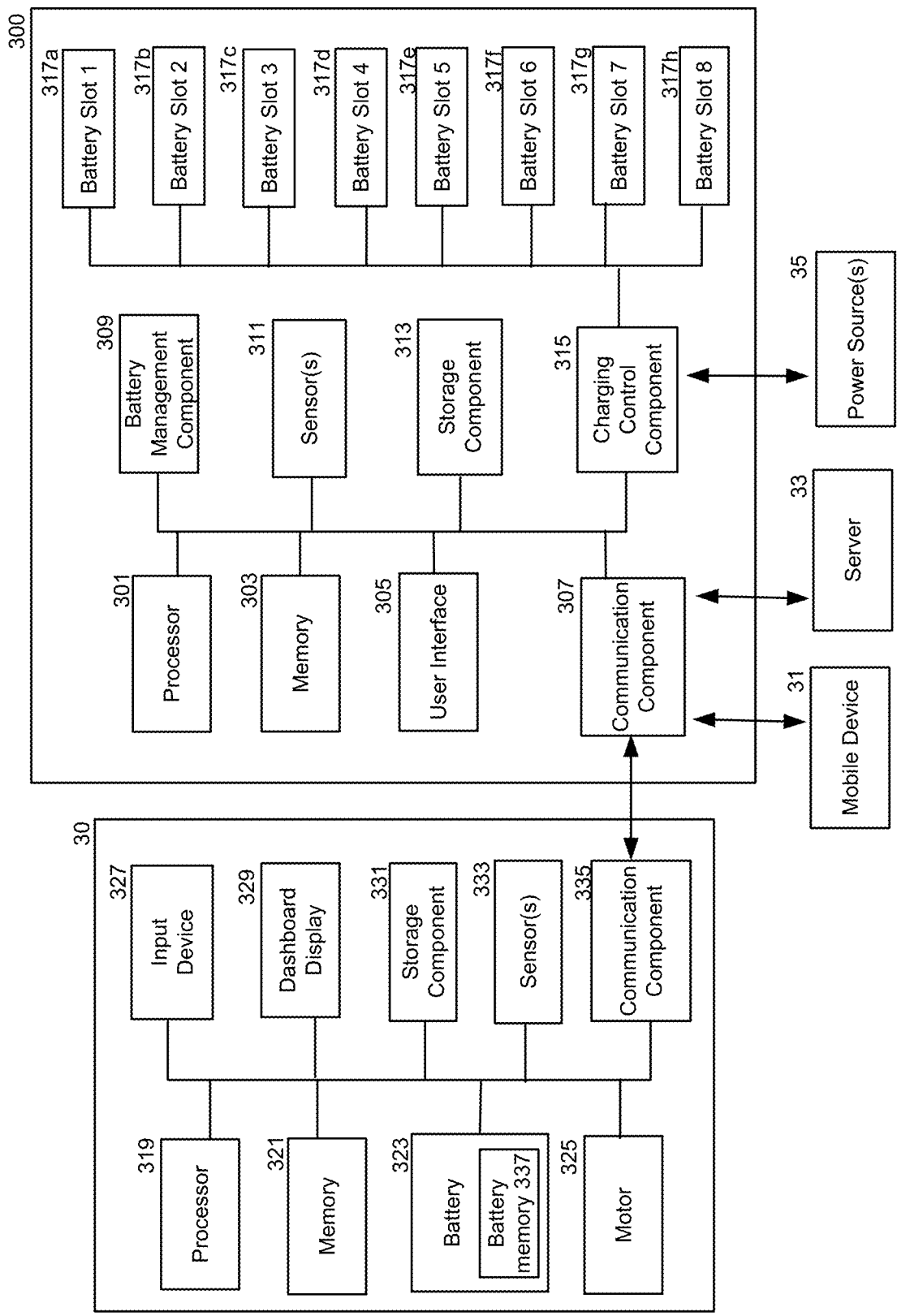
FIG. 3 is a schematic diagram illustrating a station system and a vehicle system in accordance with embodiments of the disclosed technology.

FIG. 3 is a schematic diagram illustrating a station system 300 and a vehicle system 30 in accordance with embodiments of the disclosed technology. As shown, the station system 300 includes a processor 301, a memory 303, a user interface 305, a communication component 307, a battery management component 309, one or more sensors 311, a storage component 313, and a charging component 315 coupled to eight battery slots 317a-h. The processor 301 is configured to interact with the memory 303 and other components (e.g., components 305-317) in the station system 300. The memory 303 is coupled to the processor 301 and is configured to store instructions for controlling other components or other information in the station system 300.

The user interface 305 is configured to interact with a user (e.g., receiving a user input and presenting information to the user). In some embodiments, the user interface 305 can be implemented as a touchscreen display. In other embodiments, the user interface 305 can include other suitable user interface devices. The storage component 313 is configured to store, temporarily or permanently, information, data, files, or signals associated with the station system 300 (e.g., information measured by the sensors 313, information collected by the batteries 317a-h, reference information, charging instructions; user information, etc.). The communication component 307 is configured to communicate with other systems (e.g., the vehicle system 30, a server 33, and/or other station stations) and other devices (e.g., a mobile device 31 carried by a user).

The battery management component 309 is configured to manage and control the batteries positioned in the battery slots 317a-h. In some embodiments, the battery management component 309 can manage the batteries based on instructions from the server 33 (which can function in the ways similar to the server system 200, in some embodiments). In some embodiments, the battery management component 309 can manage the batteries based on predetermined instructions or guidance (e.g., dynamic pricing strategies) stored in the station system 300 (e.g., in the storage component 313). In some embodiments, the battery management component 309 can periodically communicate with the server 33 to request update instructions.

In some embodiments, the battery management component 309 can also be configured to collect information regarding the batteries positioned in the battery slots 317a-h, information regarding the station system 300, information regarding one or more power sources 35, information regarding a user (e.g., received from the mobile device 31 via the communication component 307), and/or information regarding the vehicle system 30. The battery management component 309 can transmit or upload the collected information to the server 33 for further analysis or process.

The sensors 311 are configured to measure information associated with the station system 300 (e.g., working temperature, environmental conditions, power connection, network connection, etc.). The sensors 311 can also be configured to monitor the batteries positioned in the battery slots 317a-h. The measured information can be sent to the battery management component 309 and the server 33 for further analysis.

The charging component 315 is configured to control a charging process for each of the batteries positioned in the battery slots 317a-h. In some embodiments, the station system 300 can include other numbers of battery slots. The battery slots 317a-h are configured to accommodate and charge the batteries positioned and/or locked therein. The charging component 315 receives power from the power sources 35 and then uses the power to charge the batteries positioned in the battery slots 317a-h, based on a predetermined charging plan received from the server 33 or stored in the storage component. In some embodiments, the charging plan can be determined based on a battery demand prediction generated by the server 33. For example, using the battery demand prediction to determine how much electric power is required to charge the batteries located in the battery slots 317a-h.

As shown in FIG. 3, the vehicle 30 can be implemented as an electric scooter, an electric car, etc. The vehicle 30 includes a processor 319, a memory 321, a battery 323, a motor 325, an input device 327, a dashboard display 329, a storage device, one or more sensors 333, and a communication component 335. The processor 319 is configured to interact with the memory 321 and other components (e.g., components 323-335) in the vehicle system 30. The memory 321 is coupled to the processor 319 and is configured to store instructions for controlling other components or other information in the vehicle system 30. The storage device 331 can have similar functions as the storage component 313 or 207. The communication component 335 can have similar functions as the communication component 307 or storage component 313 or 221. The dashboard display 329 is configured to visually present information to a user (e.g., information associated with the vehicle system 30).

The battery 323 is configured to power the motor 325 such that the motor 325 can move the vehicle system 30. The battery 323 can be an exchangeable battery. When the battery 323 is running out of power, a user of the vehicle system 30 can exchange or swap the battery 323 at the station system 300. For example, the user can remove the battery 323 from the vehicle system 30 and then position the battery 323 in one of the battery slots 317a-h (e.g., an empty one without a battery positioned therein). The user can then take a fully-charged battery in the battery slots 317a-h and then install it in the vehicle system 30.

In some embodiments, when the user positions the battery 323 in one of the battery slots 317a-h, the station system 300 can detect the existence of that battery and pull information therefrom. For example, the battery management component 309 can pull information associated with that battery (e.g., battery usage history, battery identity, charging cycles, full charging capacity, vehicle information of the vehicles that the battery 323 has been associated with, user activities that the battery 323 has been involved, etc.) from a battery memory 337 inside, or coupled to, the battery 323. In some embodiments, the information in the battery memory 337 can be transmitted to the server 33 via the communication component 335 or via the mobile device 31.

Figure 4A:
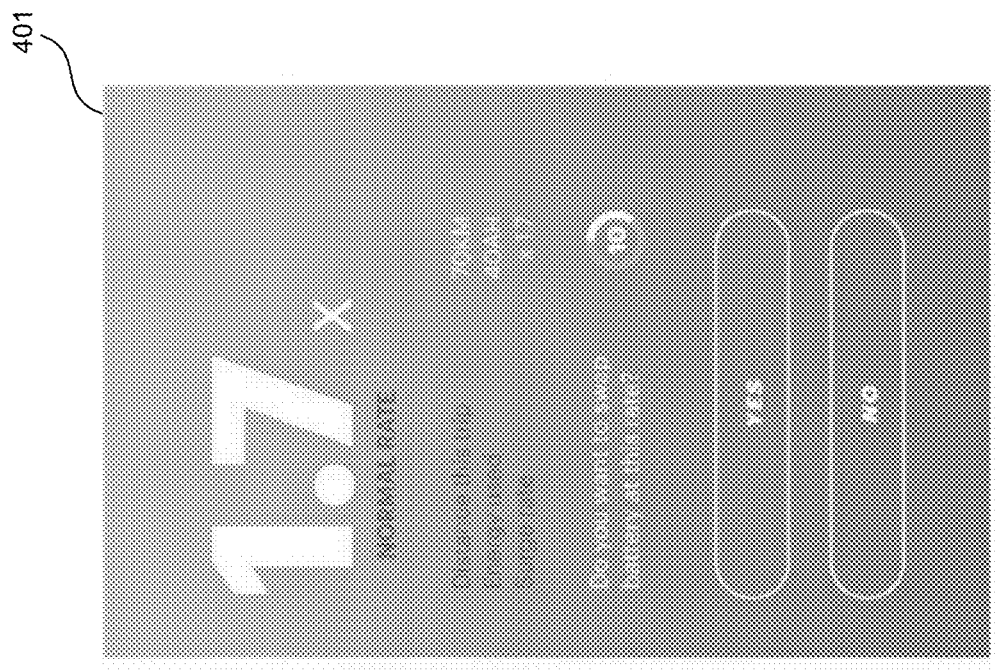
FIGS. 4A-4C and 5A-5C are screenshots showing user interfaces of a battery exchange station, a mobile device, or a dashboard (of a vehicle) in accordance with embodiments of the disclosed technology.
Figure 4A:
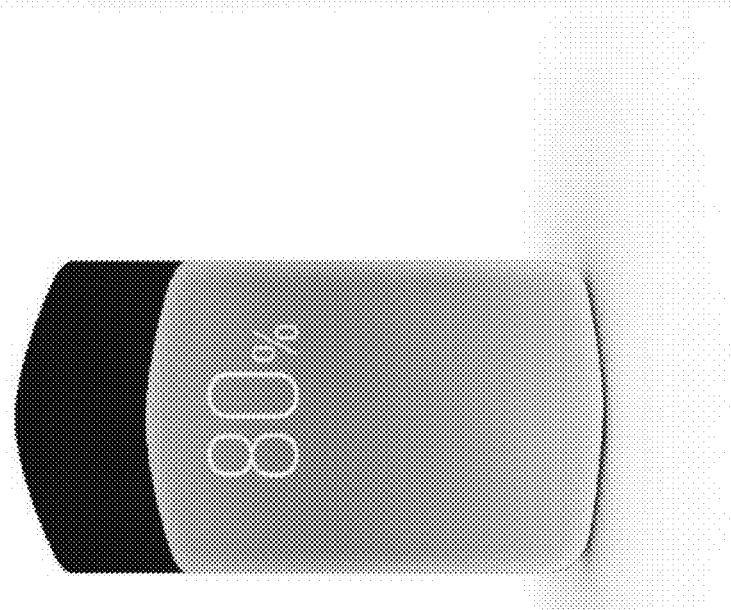

FIGS. 4A-4C and 5A-5C are screenshots showing user interfaces of a battery exchange station, a mobile device, or a dashboard (of a vehicle) in accordance with embodiments of the disclosed technology. In FIG. 4A, a user interface 401 can notify a user that a battery exchange station is offering a "1.7" battery price rate. The battery price rate higher than "1" indicates a high battery demand (e.g., at the current time interval or has a high predicted demand in the next time interval). When a user receives a notice of this high battery price rate, the user may change his or her behavior accordingly. For example, a user who originally plans to swap a battery at that station may delay his battery exchange (e.g., waiting for a better/lower rate). As another example, a user who currently possesses charged batteries may consider to "trade in" or "sell" the batteries. For example, if the user trades in a battery at the "1.7" rate, the user can receive additional 70% credit/cash/points compared to the normal rate (which is "1"). If the user wants to take this offer, the user can hit the button "YES" shown in the user interface 401 and ride 70 kilometers to that station.

Figure 4B:

In FIG. 4B, a user interface 403 shows that a notification 405 can be displayed at a corner of the user interface 403, reminding a user that there is a pending battery exchange offer. In the illustrated embodiment, the notification 405 indicates that an offered battery price rate is "0.8," which means if the user goes to a particular battery station to swap a battery, the user can get a 20% discount of the normal price.

Figure 4C:
Figure 5C:
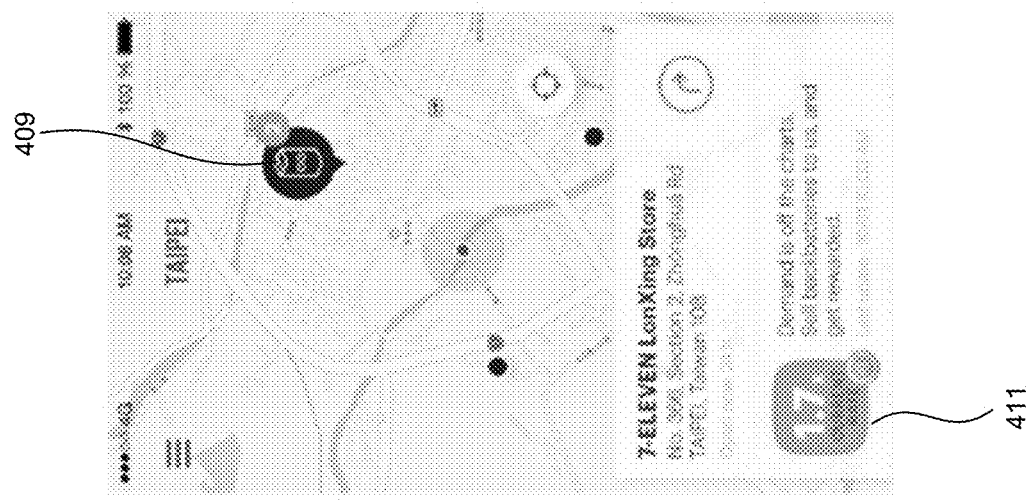
Figure 5B:
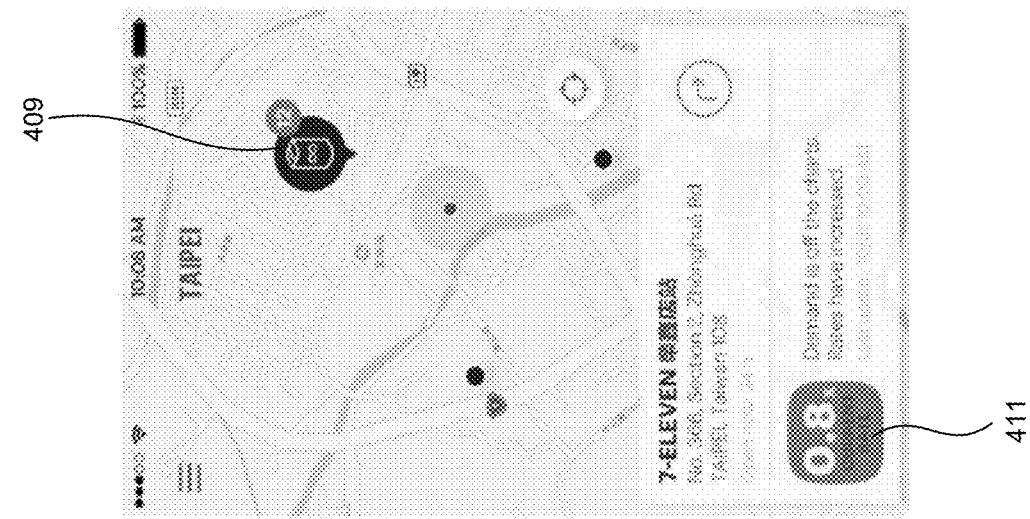
Figure 5A:
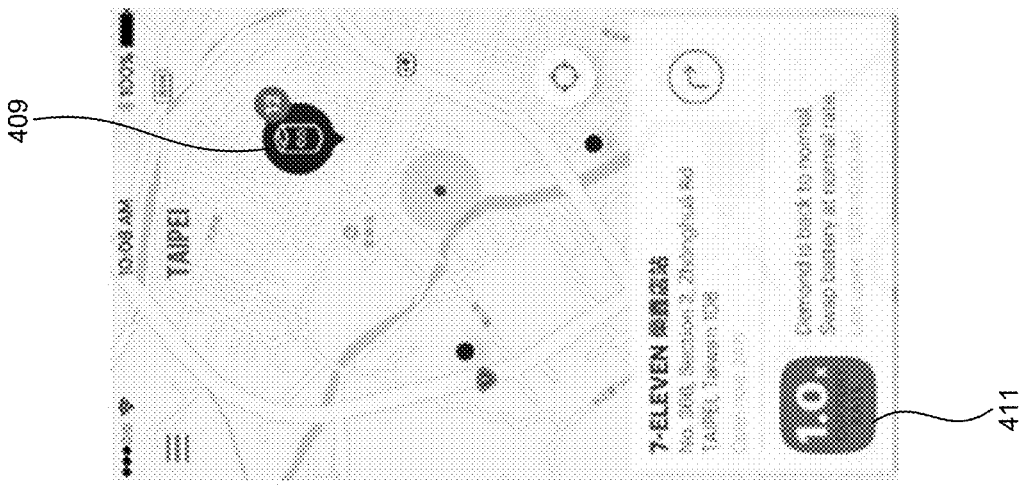

In some embodiments, as shown in FIG. 4C, a user interface 407 can particularly ask a user to trade in a battery with 80% charged for a 40% charged battery. In FIGS. 5A-5C, battery offers with different prices can be displayed on a map, with a first indication 409 showing numbers of available batteries and a second indication 411 showing battery price rates.

Figure 6:
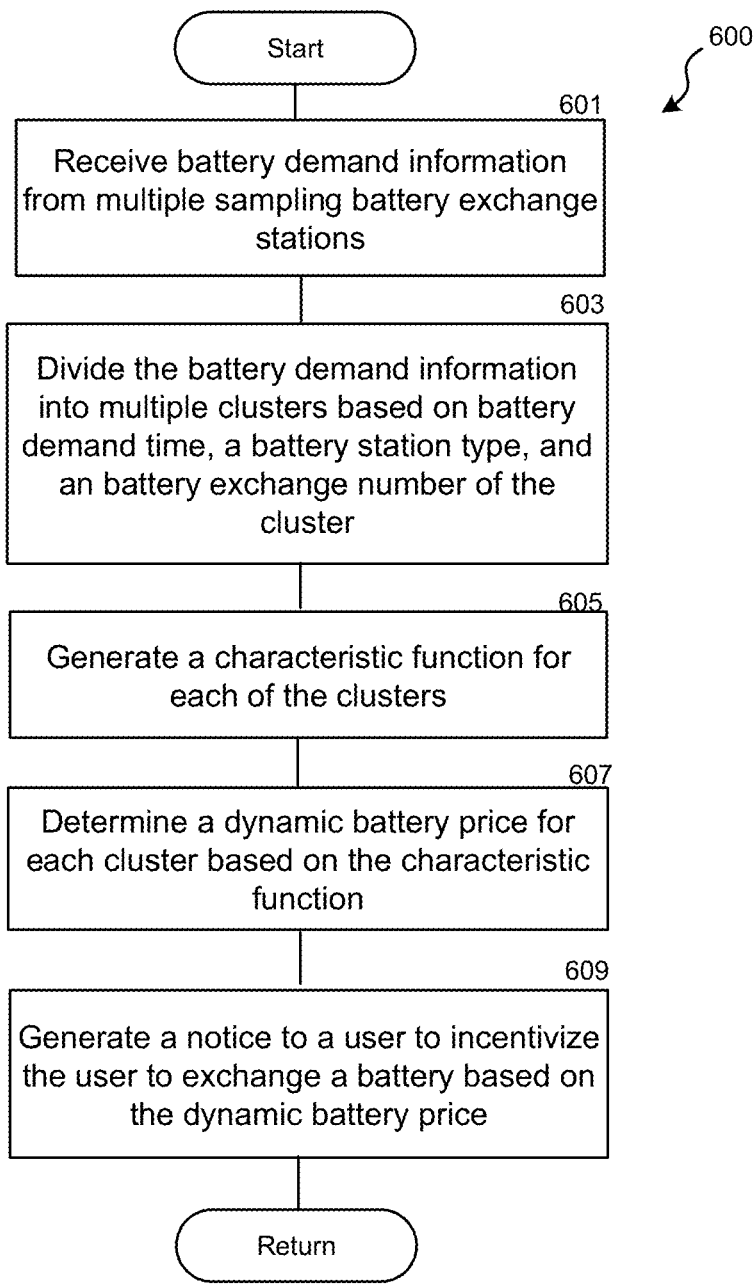
FIG. 6 is a flowchart illustrating a method in accordance with embodiments of the disclosed technology.

FIG. 6 is a flowchart illustrating a method 600 in accordance with embodiments of the disclosed technology. The method 600 is configured to balancing available energy among multiple battery-exchange stations. The method 600 can be implemented by a server (e.g., the server system 200). In some embodiments, the method 600 can be implemented by a battery exchange station (e.g., the station system 300). The method 600 starts at block 601 by receiving battery demand information from multiple sampling battery exchange stations. In some embodiments, these energy storage devices can be located in multiple sampling stations, vehicles, or otherwise held/stored by a user.

At block 603, the method 600 continues by dividing the battery demand information into multiple clusters based on battery demand time, a battery station type, and a battery exchange number of the cluster. At block 605, the method 600 then generates a characteristic function for each of the clusters. The characteristic function is determined based on an energy ratio and a battery price rate (e.g., FIG. 1G). At block 607, the method 600 then determines a dynamic battery price for each cluster based on the characteristic function. The energy ratio is determined based on a battery energy level associated with a battery exchange event (e.g., a user changes a battery at a station) and an available battery count associated with the battery exchange event. The energy ratio of a battery station is indicative of a relative value at a particular time. For example, if the energy ratio of a station is high, it may indicate that its current energy supply is sufficient to cover the current demand. If the energy ratio of a station is low, it may indicate that its current energy supply is not enough. Accordingly, the present system can initiate a dynamic pricing process to incentivize users to carry or transport charged batteries to this station. For example, at block 609, the method 600 can generate a notice to a user to incentivize the user to exchange a battery based on the dynamic battery price. The method 600 then returns and waits for further instructions.

FIG. 7A is a schematic diagram illustrating characteristics of multiple station systems in accordance with embodiments of the disclosed technology. In FIG. 7A, three two-dimensional characteristic curves 701A, 701B and 701C are shown. In other embodiments, however, the characteristic curves can be three-dimensional or multiple-dimensional, depending on the number of factors to be considered when generating such characteristic curves.

The characteristic curves 701A-C represent battery demand predictions (or power consumption predictions) for Stations A-C that are generated (e.g., by a server such as the server system 200) based on information associated with multiple sampling stations (e.g., the collected information mentioned above). In some embodiments, these characteristic curves 701A-C can be compared with actual measurements so as to verify and/or enhance the accuracy of these curves (e.g., compare the characteristic curve 701A with a curve generated by actual measurement performed at Station A). In such embodiments, the results of the comparison can be used to further adjust the characteristic curves 701A-C. In some embodiments, the present technology can use this approach to fine-tune its analysis based on various factors, weightings for the factors, algorithms, etc.

As shown in FIG. 7A, the characteristic curve 701A has a peak portion 703 which can indicate that Station A is a "high-demand-peak-hours" type station. The characteristic curve 701B has a smooth curve which may indicate that Station B has a relative high battery demand in certain time period (e.g., in the mornings) and therefore can be a "commuter" type station. As for Station C, the characteristic curve 701C has a plateau portion 705 in the middle of a day. The plateau portion 705 can indicate that Station C has a relatively high battery demand at noon which can be caused by the traffic to a famous restaurant close to Station C. In some embodiments, the present technology can provide multiple types of characteristic curves or patterns that can be used as reference information to determine battery demand predictions for a battery exchange station.

FIG. 7B is a schematic diagram illustrating characteristics during multiple time frames of a station system in accordance with embodiments of the disclosed technology. In FIG. 7B, three characteristic curves 707A-C for Station X are shown. The characteristic curves 707A-C represent battery demand predictions for Station X in different time frames (e.g., a day, a week, and a year) generated based on information associated with multiple sampling stations.

As shown, the characteristic curve 707A has two peak portions 708 and 709. The peak portions 708 and 709 can indicate commuter traffics close to Station X. The characteristic curve 707B has a plateau portion 711 during the weekdays, which may indicate Station X is close to a road that are intensively used by commuters on weekdays, rather than weekends. The characteristic curve 707C also has two peak portions 713 and 714 in February and July, respectively. These two peak portions 713 and 714 can indicates battery demands caused by events held in a stadium (e.g., in February and July) close to Station X.

In some embodiments, the present technology can provide other types of characteristics or patterns by selecting different factors in different time frames. By this arrangement, the present technology enables an operator to effectively predict a battery demand for a particular battery exchange station (no matter this station is new or an existing one). The present technology provides flexibility to effectively maintain multiple battery exchange stations. The present technology can enhance energy-efficiency and thus reduce overall expense for charging batteries.

In some embodiments, to enhance user experience, when the system determines to adjust a battery exchange price for a battery station, the disclosed system can perform this in a "smooth" manner such that users do not experience dramatic price change in a short period of time. For example, the disclosed system can determine that the battery exchange price rate at Station Z during 5-6 p.m. is "0.7" and that the battery exchange price rate at Station Z during 6-7 p.m. is "1.2." The system can start to gradually increase the battery exchange price rate at Station Z from 5:40 p.m. For example, the disclosed system can set the price as "0.9" at 5:45 p.m., "1.0" at 5:50 p.m., and "1.1" at 5:55 p.m. By this arrangement, users can be aware of the upcoming price increase.

In some embodiments, the battery exchange prices at each battery station in proximity can be further adjusted. For example, Stations A, B, and C are in Area X (e.g., an administrative district, a neighborhood, etc.). Users who exchange batteries in Area X can potentially exchange batteries at Stations A, B, and C. To avoid a significant price difference among Stations A, B, and C, the system can set the battery exchange price in Area X as an average price of the calculated prices of Stations A, B, and C (e.g., calculated based on embodiments discussed above with reference to FIG. 1G). Accordingly, the users in Area X do not see a significant price difference at different stations in that area. The foregoing feature can be named as a "regional average" feature.

In some embodiments, the present method can be implemented without the clustering process (FIG. 1C). In such embodiments, the method includes, for example, (1) determining a "price rate" for each of the stations; (2) calculating a score of each stations based on availability batteries and predicted battery demand; (3) sorting the stations based on the scores of each of the batteries therein; (4) defining a characteristic curve according to preset requirements (e.g., expect ratio, lower bound, upper bound, etc.), wherein the characteristic curve corresponds to distributions of ratings; (5) Mapping the sorted stations with the characteristic curve and determining the corresponding rating of each of the stations.

In the embodiments discussed herein, a "component" can include a processor, control logic, a digital signal processor, a computing unit, and/or other suitable devices.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for managing a plurality of device-exchange stations, the method comprising:
    determining a score for each of the plurality of device-exchange stations based on an availability of energy storage devices positioned in each of the device-exchange stations;
    determining a sequence of the plurality of device-exchange stations based on the score of each of the device-exchange stations;
    determining a price rate for each of the device-exchange stations by mapping the sequence of the device-exchange stations to a characteristic curve corresponding to a distribution of the price rate; and
    displaying the price rate on a user interface.

2. The method of claim 1, wherein the characteristic curve is determined based on an expectation value and a range of the price rate, and wherein the expectation value and the range of the price rate are determined based on a user input.

3. The method of claim 1, wherein the characteristic curve is determined based on a normal distribution curve.

4. The method of claim 1, wherein the score is derived from an available energy-storage-device count.

5. The method of claim 4, further comprising determining the available energy-storage-device count based on a difference between a predicted device demand and a predicted device supply.

6. The method of claim 1, further comprising adjusting the price rate of at least two device-exchange stations of the device-exchange stations that are adjacent to each other by averaging the price rates of the at least two device-exchange stations of the device-exchange stations.

7. The method of claim 1, wherein:
    at least two first device-exchange stations of the device-exchange stations are located in a first administrative district;
    at least two second device-exchange stations of the device-exchange stations are located in a second administrative district;
    the method further comprises:
        generating a first adjusted price rate for each of the first device-exchange stations based on a first sub-characteristic curve; and
        generating a second adjusted price rate for each of the second device-exchange stations based on a second sub-characteristic curve.

8. The method of claim 7, wherein a first average of the first adjusted rates for the first device-exchange stations is generally the same as a second average of the second adjusted rates for the second device-exchange stations.

9. The method of claim 1, further comprising:
    dividing the device-exchange stations into at least two sets of device-exchange stations based on adjacency of the device-exchange stations;
    creating a sub-sequence for the device-exchange stations in each of the at least two sets; and
    adjusting the price rate for each of the device-exchange stations in each of the at least two sets by mapping the sub-sequence to a sub-characteristic curve.

10. The method of claim 1, further comprising adjusting a sell-back price rate of at least one device-exchange station of the device-exchange stations based on the price rate of the at least one device-exchange station so as to provide an incentive to a user to sell back a charged battery.

11. The method of claim 1, further comprising:
    dividing the plurality of device-exchange stations into first and second clusters;
    and adjusting the characteristic curve to form a first characteristic curve for the first cluster and to form a second characteristic curve for the second cluster.

12. A system for managing a plurality of device-exchange stations, the system comprising:
a processor configured to—
determine a score for each of the plurality of device-exchange stations based on an availability of energy storage devices positioned in each of the device-exchange stations;
determine a sequence of the plurality of device-exchange stations based on the score of each of the device-exchange stations; and
determine a price rate for each of the device-exchange stations by mapping the sequence of the device-exchange stations to a characteristic curve corresponding to a distribution of the price rate, wherein the price rate is to be displayed on a user interface.

13. The system of claim 12, wherein the characteristic curve is determined based on an expectation value and a range of the price rate, and wherein the expectation value and the range of the price rate are determined based on a user input.

14. The system of claim 12, wherein the score is derived from an available energy-storage-device count, and wherein the processor is configured to determine the available energy-storage-device count based on a difference between a predicted device demand and a predicted device supply.

15. A method for balancing available energy among multiple battery-exchange stations, the method comprising:
receiving battery demand information from multiple sampling battery exchange stations;
generating a characteristic function based on the received battery demand information, wherein the characteristic function is determined based on an energy ratio and a battery price rate, wherein the energy ratio is determined based on a battery energy level associated with a battery exchange event and an available battery count associated with the battery exchange event, and wherein the battery price rate is determined based on a characteristic curve corresponding to a distribution of price rates;
determining a battery price for each of the multiple battery-exchange stations based on the characteristic function; and
displaying the price rate on a user interface.

16. The method of claim 15, further comprising generating a notice to motivate a user to exchange a battery based on the determined battery price.

17. The method of claim 15, further comprising:
dividing the battery demand information into multiple clusters based on battery demand time interval, a battery station type, and a battery exchange number of the cluster.

18. The method of claim 17, further comprising:
generating the characteristic function for each of the clusters.

19. The method of claim 18, further comprising:
determining the battery price for each cluster based on the characteristic function.

20. The method of claim 19, wherein the characteristic function is generated based on a generic algorithm (GA), and wherein the multiple clusters are determined based on a K-means clustering algorithm.

* * * * *